United States Patent
Robertson et al.

(10) Patent No.: US 12,543,971 B2
(45) Date of Patent: Feb. 10, 2026

(54) DEVICE FOR MEASURING A PERSON'S VENTILATION INCLUDING OXYGEN-CONSUMPTION, AND A DEHUMIDIFICATION ASSEMBLY AND CONDUIT ASSEMBLY THEREFOR

(71) Applicant: VO2 Master Health Sensors Inc., Vernon (CA)

(72) Inventors: Brandon Robertson, West Kelowna (CA); Kyle Halliday, Ladysmith (CA); Peter O'Brien, Vernon (CA); James Webber, Vernon (CA); Lucas Cernigoj, Vernon (CA)

(73) Assignee: VO2 MASTER HEALTH SENSORS INC., Vernon (CA)

( * ) Notice: Subject to any disclaimer, the term of this patent is extended or adjusted under 35 U.S.C. 154(b) by 910 days.

(21) Appl. No.: 17/772,582

(22) PCT Filed: Oct. 12, 2021

(86) PCT No.: PCT/CA2021/051431
§ 371 (c)(1),
(2) Date: Apr. 28, 2022

(87) PCT Pub. No.: WO2022/077101
PCT Pub. Date: Apr. 21, 2022

(65) Prior Publication Data
US 2023/0008346 A1    Jan. 12, 2023

Related U.S. Application Data

(60) Provisional application No. 63/090,940, filed on Oct. 13, 2020.

(51) Int. Cl.
*A61B 5/097*    (2006.01)
*A61B 5/083*    (2006.01)
(Continued)

(52) U.S. Cl.
CPC ............ *A61B 5/097* (2013.01); *A61B 5/0833* (2013.01); *B01D 53/268* (2013.01); *A61B 5/6803* (2013.01)

(58) Field of Classification Search
CPC ..... A61B 5/097; A61B 5/0833; A61B 5/6803; A61B 5/082; A61B 5/0836; A61B 5/087;
(Continued)

(56) References Cited

U.S. PATENT DOCUMENTS 3,661,528 A    5/1972  Falk
3,735,752 A    5/1973  Rodder
(Continued)

FOREIGN PATENT DOCUMENTS

CA    2430613    11/2004
EP    0794806    2/1996
(Continued)

OTHER PUBLICATIONS

"Venturi", Merriam-Webster Online and found on the WayBackMachine archived page dated Feb. 19, 2010: https://web.archive.org/web/20100219215417/https://www.merriam-webster.com/dictionary/venturi.
(Continued)

*Primary Examiner* — Andrey Shostak
(74) *Attorney, Agent, or Firm* — Nicholas Garner; Oyen Wiggs Green & Mutala LLP

(57) ABSTRACT

There is accordingly provided a device for measuring a person's ventilation including oxygen consumption. The device includes a breathing conduit with at least one sensor sampling port. The device includes a dehumidification conduit extending from the sensor sampling port towards a sensor. The dehumidification conduit has a proximal end portion flush with the sensor sampling port. The dehumidification conduit has a longitudinal axis about which the
(Continued)

proximal end portion thereof extends. The breathing conduit is shaped to promote a flow of air adjacent the sensor sampling port in one or more directions perpendicular to the longitudinal axis.

20 Claims, 13 Drawing Sheets

(51) Int. Cl.
  *B01D 53/26* (2006.01)
  *A61B 5/00* (2006.01)
(58) Field of Classification Search
  CPC .......... B01D 53/268; B01D 2259/4533; B01D 2259/4541; A61M 16/0808; A61M 16/085; G01N 33/497
  See application file for complete search history.

(56) References Cited

U.S. PATENT DOCUMENTS

| | | | |
|---|---|---|---|
| 3,924,467 | A | 12/1975 | Takamura et al. |
| 4,142,407 | A | 3/1979 | Kuroiwa et al. |
| 4,197,857 | A | 4/1980 | Osborn |
| 4,292,978 | A | 10/1981 | Guth |
| 4,297,871 | A | 11/1981 | Wright et al. |
| 4,404,859 | A | 9/1983 | Ohsawa et al. |
| 4,440,177 | A | 4/1984 | Anderson et al. |
| 4,620,248 | A | 10/1986 | Gitzendanner |
| 4,658,832 | A | 4/1987 | Brugnoli |
| 4,705,543 | A | 11/1987 | Kertzman |
| 4,736,750 | A | 4/1988 | Valdespino et al. |
| 4,808,201 | A | 2/1989 | Kertzman |
| 5,072,737 | A | 12/1991 | Goulding |
| 5,184,501 | A | 2/1993 | Lewis et al. |
| 5,363,857 | A | 11/1994 | Howard |
| 5,705,735 | A | 1/1998 | Acorn |
| 5,857,461 | A | 1/1999 | Levitsky et al. |
| 5,913,249 | A | 6/1999 | Weckstrom |
| 5,957,127 | A | 9/1999 | Yamamori et al. |
| 6,206,837 | B1 | 3/2001 | Brugnoli |
| 6,435,183 | B1 | 8/2002 | Farman |
| 6,572,561 | B2 | 6/2003 | Mault |
| 6,612,306 | B1 | 9/2003 | Mault |
| 6,629,933 | B1 | 10/2003 | Lindner |
| 6,629,934 | B2 | 10/2003 | Mault et al. |
| 6,815,211 | B1 | 11/2004 | Blazewicz et al. |
| 6,899,683 | B2 | 5/2005 | Mault et al. |
| 6,955,650 | B2 | 10/2005 | Mault et al. |
| 6,983,663 | B2 | 1/2006 | Fathollahzadeh |
| 7,108,659 | B2 | 9/2006 | Ross et al. |
| 7,618,235 | B2 | 11/2009 | Sacco |
| 7,621,271 | B2 | 11/2009 | Brugnoli |
| RE41,332 | E | 5/2010 | Binder |
| 7,730,793 | B2 | 6/2010 | Speldrich |
| 8,002,712 | B2 | 8/2011 | Meka et al. |
| 8,197,417 | B2 | 6/2012 | Howard et al. |
| 8,684,900 | B2 | 4/2014 | Tran |
| 9,498,150 | B2 | 11/2016 | Colman et al. |
| 9,706,965 | B2 | 7/2017 | Colman et al. |
| 10,271,766 | B1 | 4/2019 | Parker, Jr. et al. |
| 10,381,849 | B2 | 8/2019 | Wing et al. |
| 11,284,814 | B2 | 3/2022 | O'Brien et al. |
| 2002/0100474 | A1 | 8/2002 | Kellner et al. |
| 2003/0028120 | A1 | 2/2003 | Mault et al. |
| 2003/0065274 | A1 | 4/2003 | Mault et al. |
| 2003/0208132 | A1 | 11/2003 | Baddour |
| 2003/0208133 | A1 | 11/2003 | Mault |
| 2004/0094155 | A1 | 5/2004 | Castor et al. |
| 2004/0186390 | A1 | 9/2004 | Ross et al. |
| 2005/0004488 | A1 | 1/2005 | Hoppe et al. |
| 2005/0154386 | A1* | 7/2005 | West .................. A61B 18/1492 606/41 |
| 2007/0093725 | A1 | 4/2007 | Shaw |
| 2007/0107728 | A1 | 5/2007 | Ricciardelli et al. |
| 2010/0036272 | A1 | 2/2010 | Mace et al. |
| 2011/0319783 | A1 | 12/2011 | Lindholt et al. |
| 2012/0234696 | A1* | 9/2012 | Mosley ................ G01N 27/404 204/407 |
| 2013/0267803 | A1 | 10/2013 | Kramer |
| 2013/0331726 | A1 | 12/2013 | Weber |
| 2014/0024960 | A1 | 1/2014 | Smith et al. |
| 2014/0276171 | A1 | 9/2014 | Hestness et al. |
| 2014/0364758 | A1 | 12/2014 | Schindhelm et al. |
| 2014/0378792 | A1 | 12/2014 | Krimsky et al. |
| 2015/0083121 | A1 | 3/2015 | Fisher et al. |
| 2017/0049978 | A1 | 2/2017 | Berg et al. |
| 2017/0055875 | A1 | 3/2017 | Candell et al. |
| 2017/0119279 | A1 | 5/2017 | Ahmad |
| 2017/0135605 | A1 | 5/2017 | Sandholt et al. |
| 2017/0173262 | A1 | 6/2017 | Veltz |
| 2018/0153440 | A1 | 6/2018 | Lee et al. |
| 2019/0110714 | A1 | 4/2019 | O'Brien et al. |
| 2019/0120821 | A1 | 4/2019 | Atsalakis |
| 2020/0022618 | A1 | 1/2020 | Mcclung et al. |
| 2020/0121222 | A1 | 4/2020 | Becker et al. |
| 2021/0378546 | A1 | 12/2021 | Xian et al. |
| 2022/0031987 | A1* | 2/2022 | Wysoski ............. A61M 16/161 |

FOREIGN PATENT DOCUMENTS

| | | | |
|---|---|---|---|
| EP | 0911051 | | 4/1999 |
| EP | 2606820 | A1 | 6/2013 |
| EP | 2670491 | A2 | 12/2013 |
| EP | 2769673 | A1 | 8/2014 |
| EP | 2259723 | | 5/2016 |
| EP | 3028627 | B1 | 7/2016 |
| WO | 9118279 | | 11/1991 |
| WO | 0028881 | | 5/2000 |
| WO | 2001008554 | | 2/2001 |
| WO | 03010496 | | 2/2003 |
| WO | 2004041084 | A1 | 5/2004 |
| WO | 2008060165 | | 5/2008 |
| WO | 2008064062 | | 5/2008 |
| WO | 2015127994 | A1 | 9/2015 |
| WO | 2016138380 | A1 | 9/2016 |
| WO | 2017177340 | | 10/2017 |
| WO | 2019173894 | | 9/2019 |
| WO | WO-2019173894 | A1 * | 9/2019 ............. A61B 5/097 |
| WO | 2020076855 | A1 | 4/2020 |

OTHER PUBLICATIONS

"Venturi effect", as set out in the archived version of the Wikipedia page for the same dated Jan. 6, 2015: https:// en.wikipedia.org/w/index.php?title=Venturi_effect&oldid=641227804.
International Search Report for PCT/CA2017/050467, dated Aug. 17, 2017.
Written Opinion for PCT/CA2017/050467, dated Aug. 17, 2017.
"Series LX-Valve" product specification, from Parker Hannifin Corp., dated Mar. 2016.
International Search Report and Written Opinion for PCT/CA2018/051314, dated Jan. 8, 2019.
European Search Report dated Jan. 17, 2020 for EP 17 78 1693.
J. C. T. Pepperell et al. "P139 The use of venturi masks with oxygen concentrators", Thorax, vol. 66, No. Suppl. 4, Dec. 1, 2011, p. A123-A124, XP055649271, GB, Issn: 0040-6376, DOI: 10.1136/thoraxjnl-2011-201054c. 139.
"Technology Overview: COSMED Wearable Metabolic Systems", COSMED, The Metabolic Company, dated Sep. 25, 2020. https://web.archive.org/web/20200925164533/https://www.cosmed.com/hires/WP_COSMED_wearable_metabolic_technology_EN.pdf.
International Search Report and Written Opinion for PCT/CA2021/051431, dated Jan. 12, 2022.
European Search Report dated Nov. 12, 2021 for EP18909533.4.
Supplementary European Search Report dated Sep. 25, 2024 issued on European Patent Application No. EP 21878818.

(56) References Cited

OTHER PUBLICATIONS

European Search Report for European Patent Application No. 23186942.1, completed Oct. 27, 2023 (mailed Nov. 7, 2023).

* cited by examiner

DEVICE FOR MEASURING A PERSON'S VENTILATION INCLUDING OXYGEN-CONSUMPTION, AND A DEHUMIDIFICATION ASSEMBLY AND CONDUIT ASSEMBLY THEREFOR

BACKGROUND OF THE INVENTION

Field of the Invention

There is provided a device for measuring a person's ventilation. In particular, there is provided a device for measuring a person's ventilation including oxygen consumption, and a dehumidification assembly therefor and a conduit assembly therefor.

Description of the Related Art

International Patent Application Publication No. WO 2019/173894 A1 to O'Brien et al. discloses relates to a device for measuring a person's ventilation. The device includes a conduit with an exhaled-air receiving portion and an inhaled-air receiving portion. The device includes pressure and oxygen sensor sampling ports. The sampling ports are in fluid communication with the conduit. The device includes a deflector disposed within the conduit. The deflector is configured to deflect air exhaled into the exhaled-air receiving portion of the conduit away from the sensor ports.

U.S. Pat. No. 4,705,543 to Kertzman discloses a fluid dryer. The fluid dryer includes a section of tubing covered by a braided netting. The tubing is formed of a material that has selective and reversible water-absorption properties. The braided netting may be composed of electrical resistance wire, metallic wire, plastic monofilament, etc. Several dryers using the braided tubing employ a desiccant bed and multiple sections of braided tubing.

United States Patent Application Publication No. 2015/0083121 to Fisher discloses a portable respiratory support apparatus adapted to be easily mounted to a stretcher is disclosed. Prior devices that attach onto a stretcher are heavy and cumbersome and obstruct access to the patient. Accordingly, there is a great need for a portable emergency support device that overcomes the weight, size, positioning, and other portability disadvantages. One aspect relates to a portable life support device including at least one ambient gas inlet; a conditioned gas outlet; an oxygen concentrator fluidly connected between the at least one gas inlet and the gas outlet, and a ventilator fluidly connected downstream from the oxygen concentrator. A further aspect is directed to a portable life support apparatus in the form of a portable respiratory support apparatus capable of exploiting both ambient air and expired gas as oxygen sources, wherein the oxygen generator and ventilator are arranged end to end to provide a longitudinal profile that can thus be compactly secured to a stretcher or other similar emergency transport vehicle.

BRIEF SUMMARY OF INVENTION

There is provided, and it is an object to provide, an improved ventilation measuring device disclosed herein.

There is accordingly provided a device for measuring a person's ventilation including oxygen consumption. The device includes a breathing conduit with at least one sensor sampling port. The device includes a dehumidification conduit extending from the sensor sampling port towards a sensor. The dehumidification conduit has a proximal end portion flush with the sensor sampling port. The dehumidification conduit has a longitudinal axis about which the proximal end portion thereof extends. The breathing conduit is shaped to promote a flow of air adjacent the sensor sampling port in one or more directions perpendicular to the longitudinal axis.

There is also provided a device for measuring a person's ventilation including oxygen consumption according to another aspect. The device includes a breathing conduit having an interior. The breathing conduit includes a wall through which extends a sensor sampling port. The device includes a dehumidification conduit coupled to and extending outwards from the sensor sampling port. The device includes adhesive that couples the dehumidification conduit to the wall at a location spaced-apart from the interior of the breathing conduit.

There is further provided a device for measuring a person's ventilation including oxygen consumption according to an additional aspect. The device includes a sensor assembly. The device includes a breathing conduit through which at least one exhalation is received. The device includes a replaceable dehumidification cartridge configured to receive a sample amount of said exhalation from the breathing conduit, dehumidify the sample amount of said exhalation, and direct the sample amount of said exhalation so dehumidified to the sensor assembly.

There is yet also provided a dehumidification assembly. The assembly includes a dehumidification conduit. The assembly includes a dehumidification chamber shaped to extend at least in part about the dehumidification conduit. The assembly includes an elongate member shaped to facilitate selective insertion of the dehumidification conduit into the dehumidification chamber and removal therefrom.

In one example, the elongate member has a stowed position in which the elongate member is positioned within the dehumidification chamber. The elongate member is moveable from the stowed position to a deployed position in which a gripping end portion thereof extends through the slot and outwards from the dehumidification chamber for selectively removing the elongate member and thus the dehumidification chamber therefrom.

There is yet further provided a conduit assembly. The assembly includes a flexible conduit. The flexible conduit has a first end and a second end spaced-apart from the first end thereof. The assembly includes a handle. The handle includes a first end portion coupled to the first end of the flexible conduit. The handle extends from the first end portion thereof towards the second end of the flexible conduit.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
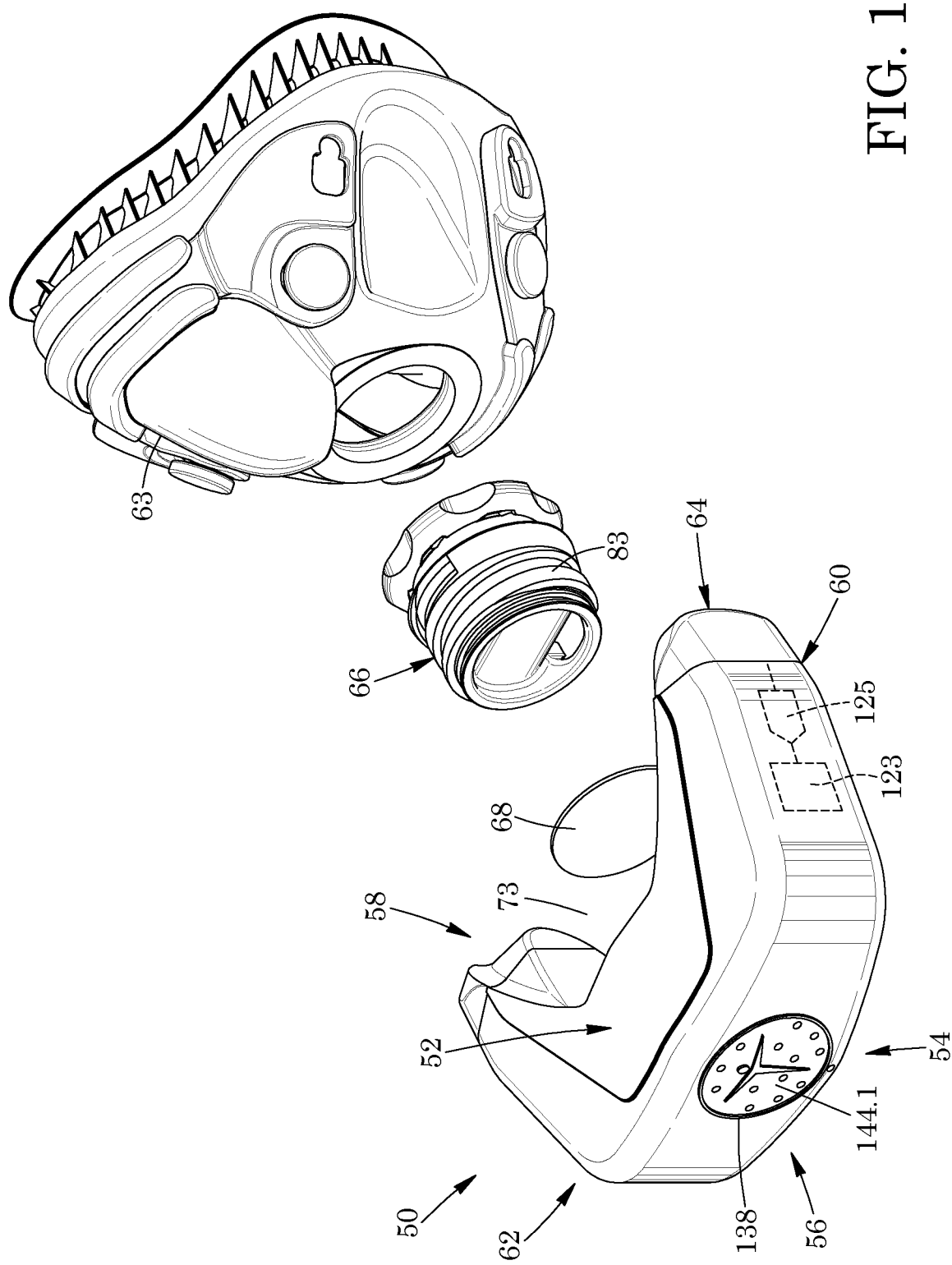
FIG. 1 is an exploded front, top, left side perspective view of a ventilation measuring device according to a first embodiment and a face mask therefor, the device including a sensor assembly, a filter, and a breathing conduit shaped to selectively couple to the sensor assembly.

Referring to the drawings and first to FIG. 1, there is provided a device for measuring a person's ventilation including oxygen-consumption, namely a ventilation measuring device 50. The device measures various ventilation-related data obtained from the person's exhalations and/or inhalations including but not necessarily limited to oxygen-consumption. The device 50 may thus also be referred to as an oxygen-consumption measuring device. The device has a top 52, a bottom 54, a front 56, a rear 58 and a pair of opposite sides 60 and 62. The sides of the device 50 extend between the top and bottom of the device, and between the front and rear of the device. The front 56 and rear 58 of the device extend between the top 52 and bottom 54 of the device.

The sides 60 and 62 and rear 58 of the device 50 are connectable to a breath-receiving member, in this example a face mask 63 shaped to cover a person's mouth and nose (not shown). In this example, the face mask is an off-the-shelf component of a 7450 V2-type which may be purchased at Hans Rudolf, Inc., having an address of 8325 Cole Parkway Shawnee, Kans., 66227, United States of America. However, this type of face mask is not strictly required and other types face masks or mouth and/or nose engagement mechanisms may be used in other embodiments, such as a swimming snorkel mouthpiece with a nose clamp, for example.

Still referring to FIG. 1, the device 50 includes a sensor assembly 64, a breathing conduit 66 threadably connectable to the sensor assembly, and a filter 68 interposable between the sensor assembly and breathing conduit thereof. The filter is circular in this example. The filter 68 is an off-the-shelf component that may be purchased at Superior Felt & Filter, having an address of 1150 Ridgeview Drive, McHenry, Illinois, 60050, United States of America, for instance. However, this is not strictly required and other types of filters may be used.

Figure 4:
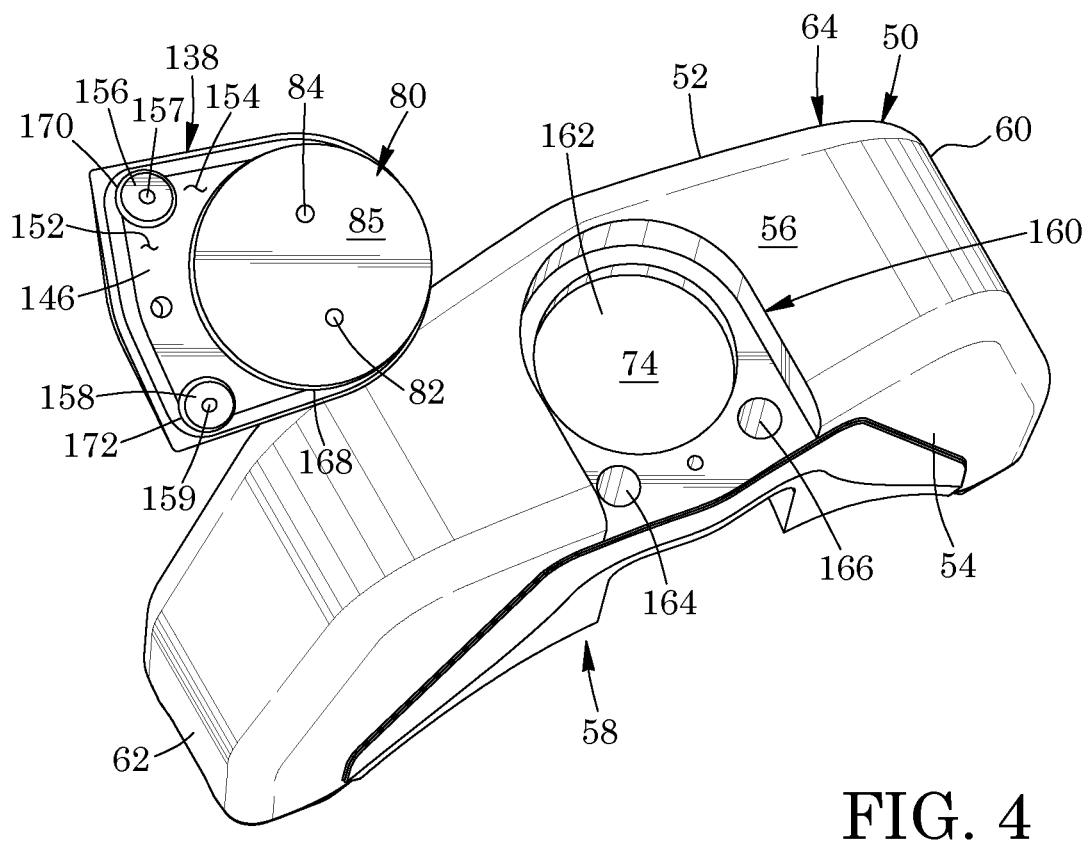
FIG. 4 is a front perspective view of the sensor assembly of FIG. 3, with the dehumidification cartridge shown removed therefrom and positioned in a rear perspective view.
Figure 5:
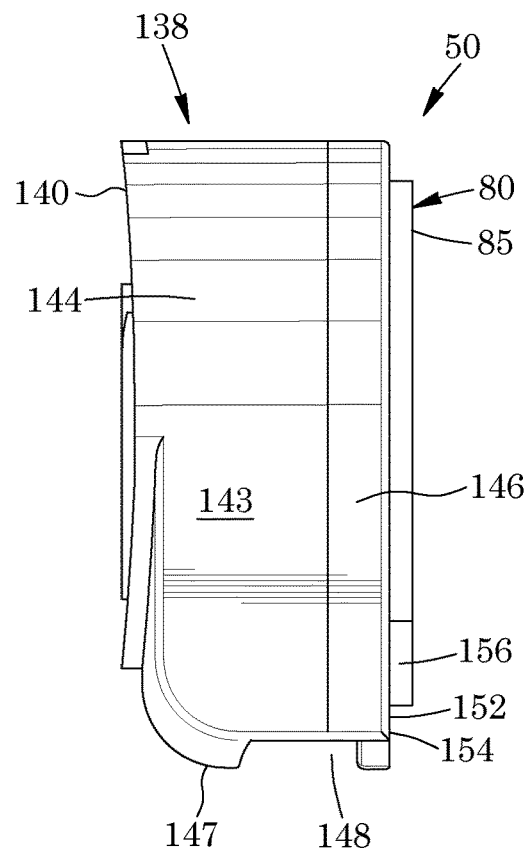
FIG. 5 is a left side elevation view of the dehumidification cartridge of FIG. 4, the dehumidification cartridge including an outer shell and an inner subassembly.

The sensor assembly 64 is u-shaped in top and bottom profile in this example. As seen in FIG. 4, the sensor assembly has a centrally-positioned recessed portion 73 extending from the rear 58 towards the front 56 of the device 50 in this example.

Figure 2:
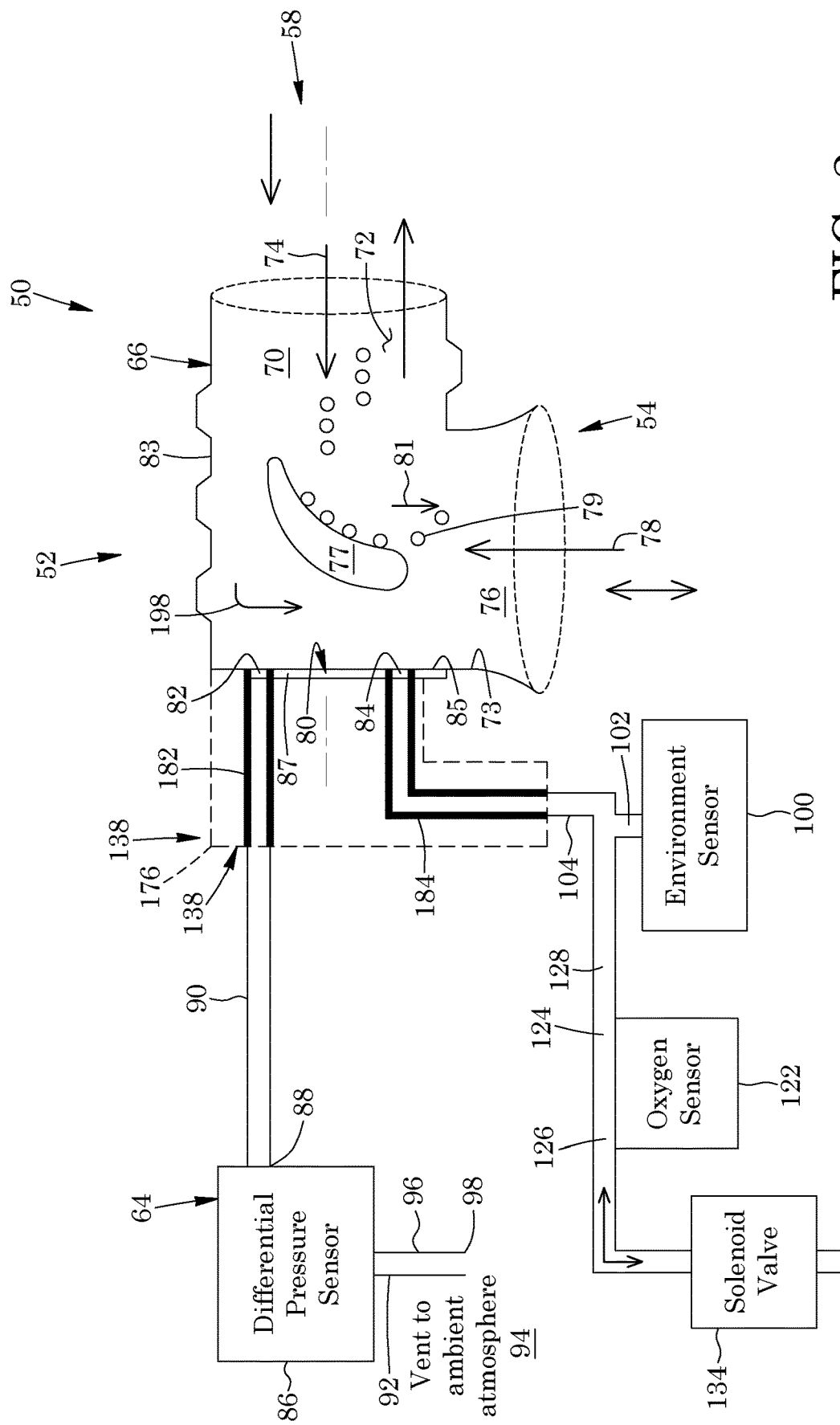
FIG. 2 is a schematic diagram of the ventilation measuring device of FIG. 1.

As seen in FIG. 2, the breathing conduit 66 has an interior 70. The breathing conduit includes an exhaled-air receiving portion 72 within the interior thereof and which receives exhalations in an airflow direction arrow 74. The breathing conduit 66 includes an inhaled-air receiving portion 76 within the interior 70 thereof and which receives inhalations in an airflow direction arrow 78. The exhaled-air receiving portion 72 of the breathing conduit is in fluid communication with the inhaled-air receiving portion 76 of the breathing conduit.

The breathing conduit 66 includes a divider or deflector 77 positioned within the interior 70 thereof. The deflector is positioned between exhaled air receiving portion 72 of the breathing conduit and inhaled-air receiving portion 76 of the breathing conduit. The deflector 77 is configured to deflect external liquid, such as saliva or water droplets 79 downwards relative to FIG. 2 and as shown by arrow 81.

The breathing conduit 66 has a first wall, in this example an annular wall 83 which in this example threadably couples to the sensor assembly 64 seen in FIG. 1. As seen in FIG. 2, the device 50 includes a second wall, in this example an end wall 80. The device has a plurality of sensor sampling ports extending through the end wall of the breathing conduit, in this example first and second sampling ports, in this case pressure sensor sampling port 82, and oxygen and environmental sensor sampling port 84. The end wall 80 may be part of the sensor assembly 64 in some embodiments, may be part of a removable cartridge in some embodiments, and/or may be integrally formed with the breathing conduit 66 in some embodiments.

Still referring to FIG. 2, the device 50 includes a flow sensing mechanism or flow sensor, in this example a pressure sensor, in this case a differential pressure sensor 86. The differential pressure sensor in this example is an off-the-shelf component, in this case an AMS5915-type pressure sensor that may be purchased at Analog Microelectronics GmbH, having an address of An der Fahrt 13, 55124 Mainz, Germany. However, this type of sensor is not strictly required and other types of pressure sensors may be used in other embodiments. The pressure sensor 86 has a first pressure sensor inlet 88 connected to and in fluid communication with pressure sensor sampling port 82 via conduit 90. The pressure sensor has a second pressure sensor inlet 92. The device 50 includes an ambient or open air port 98 and a conduit 96 which extends between the second pressure sensor inlet of the pressure sensor 86 and the open air port. The second pressure sensor inlet 92 of the pressure sensor is thus connected to and in fluid communication with the ambient air/atmosphere 94 via conduit 96 in this embodiment.

The device 50 includes an environmental sensor 100. The environmental sensor is in this example an off-the-shelf component, in this case a BME280-type environmental sensor which may be purchased at Bosch Sensortec GmbH, having an address of Gerhard-Kindler-Straße 9, 72770 Reutlingen/Kusterdingen, Germany. However, this type of sensor is not strictly required and other types of environmental sensors may be used in other embodiments. The environmental sensor 100 has a port 102 connected to and in fluid communication with oxygen and environmental sensor sampling port 84 via a passage, in this example conduit 104.

The device 50 includes an oxygen sensor 122. The oxygen sensor is a passive sensor and is an off-the-shelf component of the galvanic fuel cell type in this example. The oxygen sensor 122 may be purchased at Analytical Industries Inc., having an address of 2855 Metropolitan Place, Pomona, California, 91767, United States of America. However, this type of sensor is not strictly required and other types of oxygen sensors may be used in other embodiments. The oxygen sensor 122 has a pair of oxygen sensor ports 124 and 126 that are in fluid communication with sampling port 84 via conduits 104 and 128. Conduits 90, 104 and 128 are relatively small in volume and relatively short in length to reduce the amount of gas that is not useful, namely, gas in the sample line before the sensors that is left in the sample line between breaths. The conduits so shaped minimize the time it takes for the new gas to reach the sensors. The conduits 90, 104 and 128 so shaped also function to inhibit resistance to flow. The oxygen sensor 122 emits an oxygen sensor signal.

As seen in FIG. 1, the device 50 includes a microprocessor 123 positioned within sensor assembly 64. The microprocessor is in communication with and receives data from the oxygen sensor 122 seen in FIG. 2 via an analog-to-digital converter 125 seen in FIG. 1 in this example.

As seen in FIG. 2, the device 50 in this example includes an electromechanically operated valve, in this case a solenoid valve 134. The solenoid valve is an off-the-shelf component, in this example Parker™ 915-000001-005-type solenoid valve which may be purchased at Parker Hannifin Corp, having an address of 26 Clinton Drive, Hollis, New Hampshire, 03049, United States of America. However, this type of valve is not strictly required and other types of electromechanically operated valve and/or solenoid valves may be used in other embodiments. The solenoid valve 134 selectively opens and closes for optimal use of oxygen sensor 100 and environmental sensor 122 and calibration of the device 50. However, this is not strictly required and the device may omit the solenoid valve in other embodiments. Also, the oxygen sensor 122 is between the environmental sensor 100 and solenoid valve 134 in FIG. 2 but this too is not strictly required: for example, the oxygen sensor may be positioned closer to the sensor sampling port 84 than the environmental sensor in other embodiments.

Still referring to FIG. 2, when a person using the device 50 inhales, as seen by arrow of numeral 78, the differential pressure sensor 86 is subject to turbulence that is absent in the environmental sensor's pressure output. The device 50 is thus configured to use the change in the environmental sensor's pressure output, in the form of signals or data sent to microprocessor 123 seen in FIG. 1, to determine the inhale flow rate. This circumvents signal noise which may otherwise occur in the differential pressure sensor signal during inhales. The environmental sensor 100 also outputs temperature and relative humidity data to the microprocessor 123 seen in FIG. 1 for flow calculations and oxygen sensor signal correction. Differential pressure is used by the microprocessor to calculate both inhale and exhale flow rates. In another embodiment, absolute pressure inhale flow sensing may optionally be used.

The pressure sensor output is used for breath state detection and exhale flow rate calculations performed by the microprocessor 123 seen in FIG. 1. The pressure sensor 86 seen in FIG. 2 is used to detect breath state by means of a zero-crossing check of the differential pressure sensor output with consideration to the sensor's signal noise threshold. If the breath state is in an exhale direction as shown by arrow 74, the differential pressure sensor output is used to compute the instantaneous flow rate between data samples. If the breath state is in an inhale direction as shown by arrow 78, the difference between the environmental sensor pressure output and ambient pressure is used to compute an instantaneous flow rate between data samples. Ambient pressure is considered to be the last environmental sensor pressure output where no breathing has occurred. The instantaneous flow volume between data samples is calculated using each gap's instantaneous flow rate. When the breath state returns to no breathing, all of the instantaneous flow volumes for the completed breath segment are summed. This sum is known by those skilled in the art as tidal volume (Tv(L)). Breath segment frequency is then calculated using the following formula: (segment Rf)=30 s/(breath segment time (s)). The ventilation (Ve) of the breath segment is calculated using the following formula: Ve (L/min)=(breath segment frequency)×(breath segment tidal volume (L)). For each pair of inhale and exhale segments, average breath segment frequency (Rf), Tv, and Ve are determined as the final flow metrics for the whole breath.

The sensors 86, 100 and 122 and solenoid valve 134 together with microprocessor 123 seen in FIG. 1 function in unison to selectively acquire ventilation data and determine ventilation metrics, such as oxygen-consumption, based on the flow of exhalations passing through breathing conduit 66, as well as based on inhalations in some embodiments and/or for some aspects thereof. The device 50 as disclosed to this stage is known and is described in more detail in U.S. patent application Ser. No. 16/093,853 having a filing date of 13 Apr. 2017 and U.S. patent application Ser. No. 16/970,325 having a filing date of 18 Oct. 2018, the disclosures of which are incorporated herein by reference and priority to which is hereby claimed.

Figure 10:
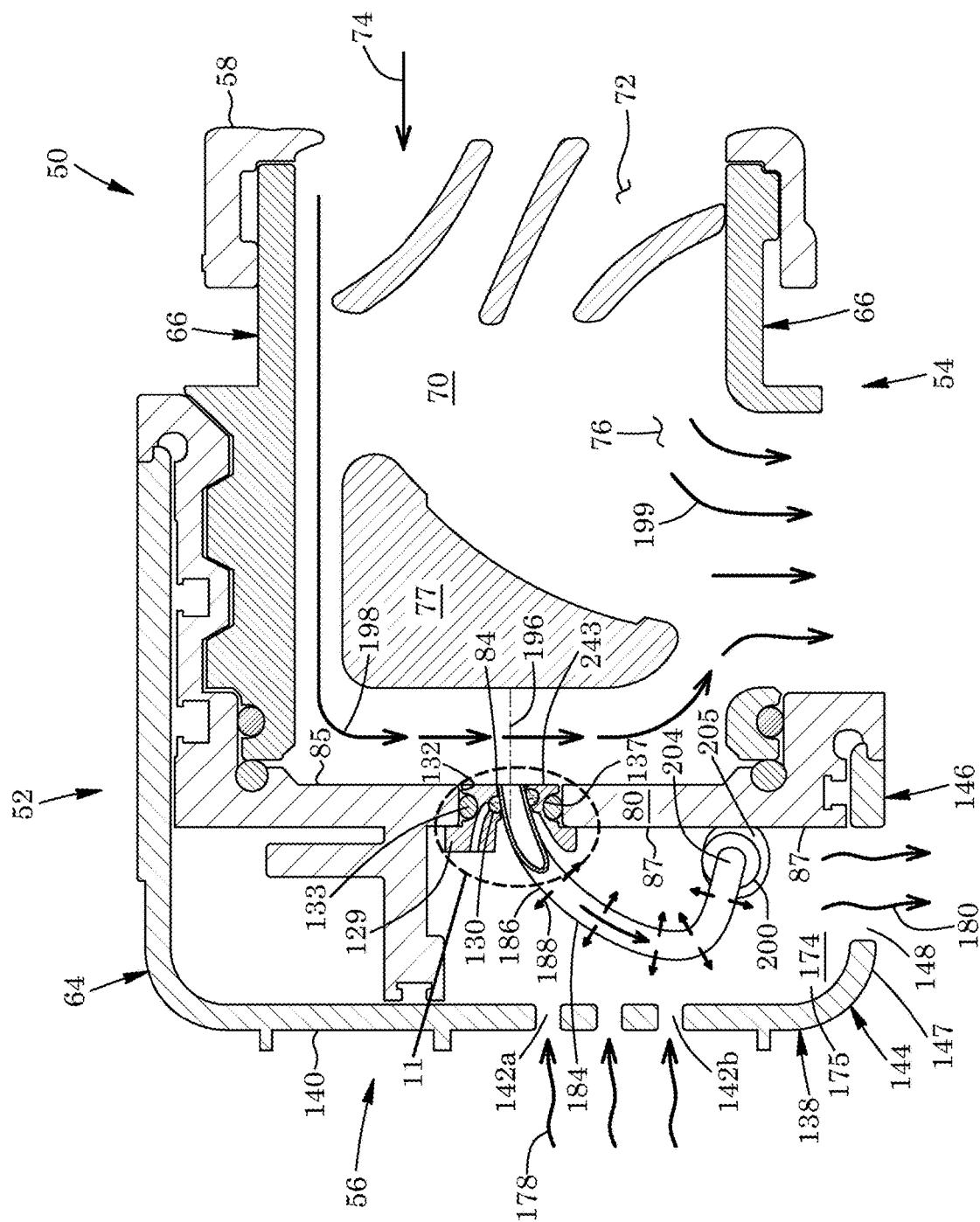
FIG. 10 is a sectional view taken along lines 10-10 of the ventilation measuring device of FIG. 3.
Figure 11:
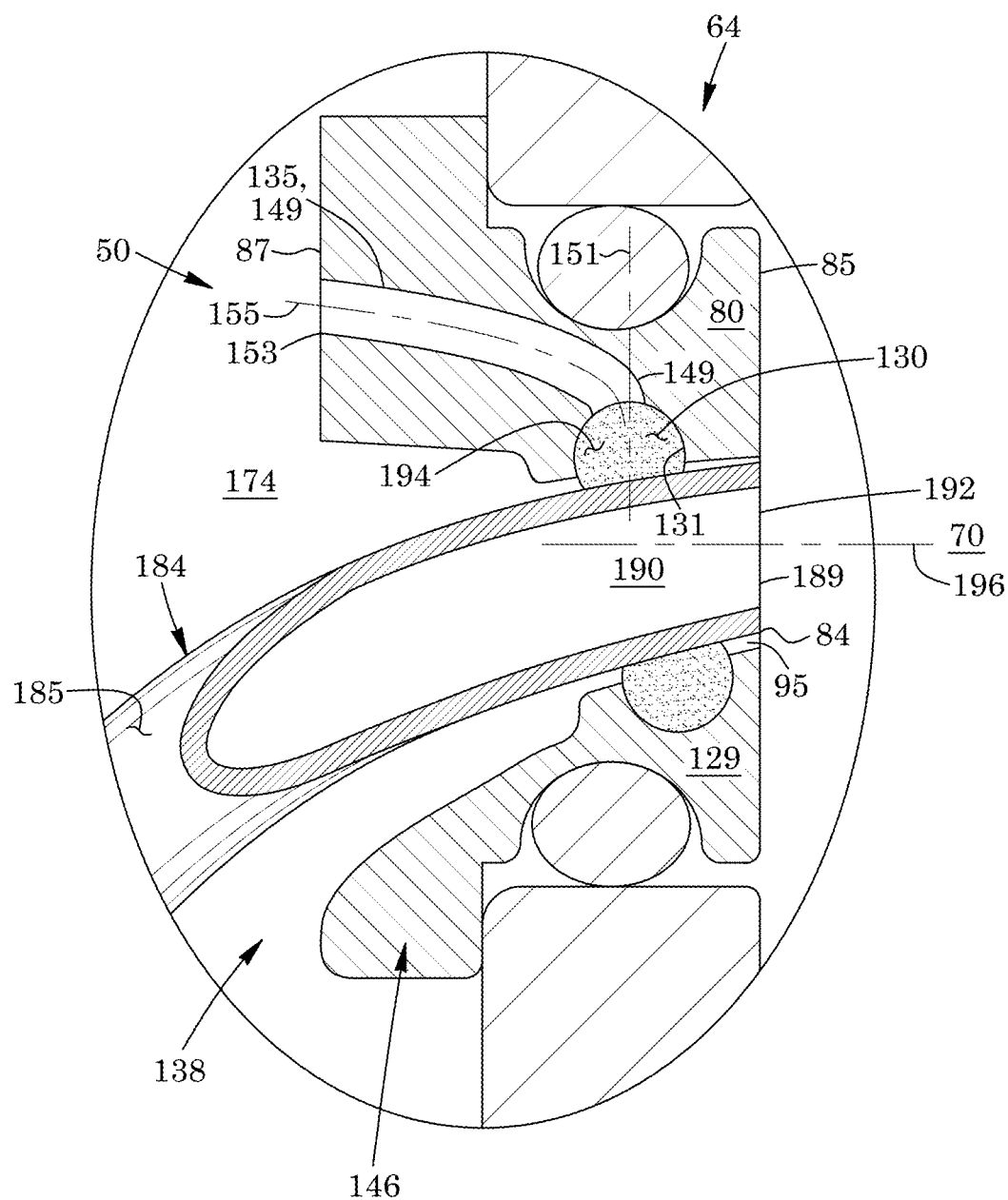
FIG. 11 is a fragmented, enlarged sectional view similar to FIG. 10 of a proximal end portion of a dehumidification conduit of the dehumidification cartridge of FIG. 10 shown coupled to an end wall of a breathing conduit of the ventilation measuring device of FIG. 10.

Referring to FIG. 10, the end wall 80 may be considered a wall of the breathing conduit 66 as seen in FIG. 2. As seen in FIG. 11, the end wall 80 has an inner side 85 in fluid communication with the interior 70 of the breathing conduit and an outer side 87 spaced-apart from the inner side thereof. As seen in FIG. 10, the end wall 80 includes a wall portion extending about each sensor sampling port, as seen by wall portion 129 extending about sensor sampling port 84. Each wall portion is planar and circular in profile in this example. Each wall portion 129 has a distal end 243 facing the interior 70 of the breathing conduit 66.

As seen in FIG. 11, each wall portion 129 includes a reservoir, in this example an inner groove or annular recess 130 spaced from the inner side 85 of the wall 80 and spaced from distal end 243 of the wall portion. The annular recess is centrally positioned relative to, is in fluid communication with and extends radially outwards from bore 95 in this example. The annular recess 130 is toroidal in shape at least in part in this example. The annular recess 130 is annular in profile and semi-circular in lateral profile in this example. As seen in FIG. 11, each annular recess 130 extends radially outwards from its corresponding sensor sampling port 84. Each annular recess is positioned between the inner side 85 of the wall 80 and the outer side 87 of the wall. Each annular recess 130 has an inward facing annular surface 131 that is outwardly concave in lateral and longitudinal section in this example.

Referring to FIG. 11, the end wall 80 includes a passageway 135 that extends from one of the sides of the end wall, in this example from the outer side 87 of the wall 80 to the annular recess 130. The passageway is in fluid communication with its respective annular recess via a first end portion 149 thereof. The first or distal end portion 149 of the passageway 135 extends about a first longitudinal axis 151 that extends radially outwards from the annular recess 130 in this example; however this is not strictly required. The passageway includes a second end portion 153 that extends along a second longitudinal axis 155 that is perpendicular to the first longitudinal axis thereof; however, this is not strictly required. The passageway 135 includes an elongate portion 161 extending between the end portions 149 and 153 thereof. The elongate portion of the passageway is arc-shaped in this example.

As seen in FIG. 10, each wall portion 129 of the wall 80 in this example is selectively removable and press-fit into a corresponding aperture 132 of the wall and coupled thereto via a seal, in this case an O-ring 133. The portion 129 of the wall through each sensor sampling port 84 extends thus sealably couples to and is selectively removable from a corresponding aperture in the wall 80. The O-ring fits within an outer annular groove 137 of the wall portion 129.

Figure 3:
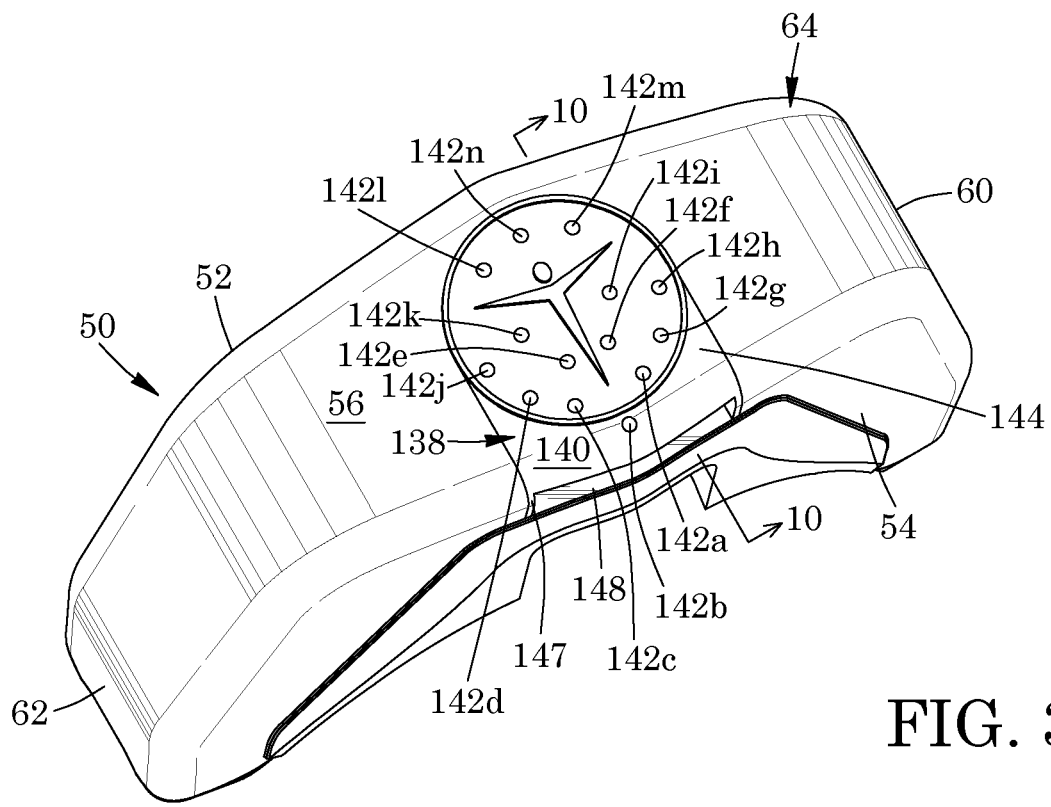
FIG. 3 is a front perspective view of the sensor assembly of FIG. 1, with the sensor assembly including a dehumidification cartridge shown coupled thereto.

As seen in FIG. 3, the device 50 includes a dehumidification assembly 138, which may be considered part of the sensor assembly 64. The dehumidification assembly has a first or front wall 140 that may be aligned with the front 56 of the device 50. However, this is not strictly required and the front wall may not be aligned with the front of the device in other embodiments. Through the front wall extends at least one and in this example a plurality of apertures 142a, 142b, 142c, 142d, 142e, 142f, 142g, 142h, 142i, 142j, 142m and 142n. Apertures 142a, 142g, 142h, 142m, 142n, 142l, 142j, 142d and 142c are arranged in a generally circular arrangement in this example, and apertures 142e, 142f, 142i and 142k are positioned within this circular arrangement in this example.

Figure 6:
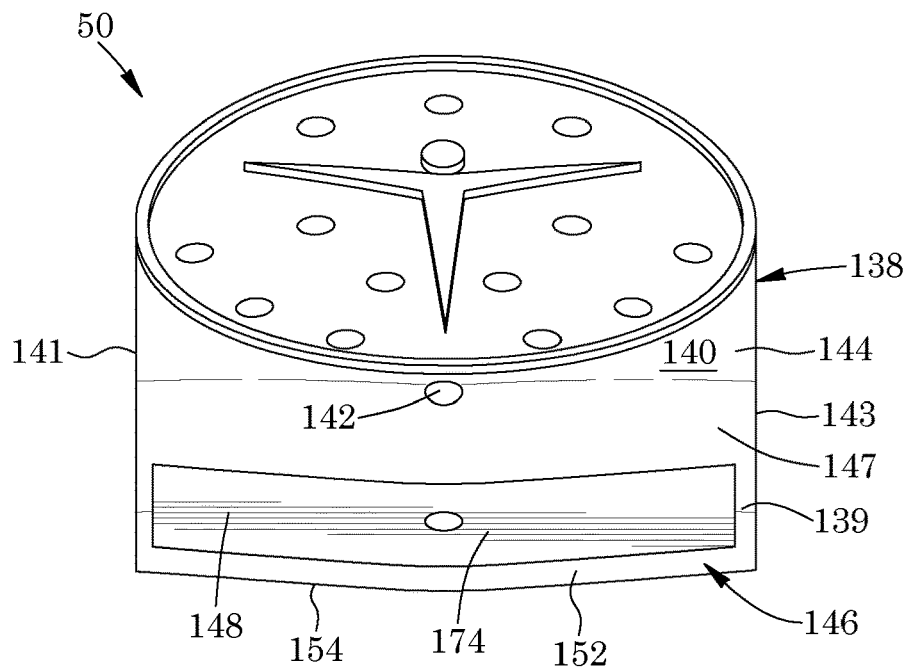
FIG. 6 is a front, bottom perspective view of the dehumidification cartridge of FIG. 5.

As seen in FIG. 6, the dehumidification assembly 138 includes an outer shell 144. The front wall 140 is part of the outer shell, and the outer shell further includes side walls 141 and 143 coupled to the front wall thereof. The dehumidification assembly 138 includes an inner subassembly 146 to which the outer shell 144 selectively couples. In this example the inner subassembly couples to the outer shell via a press-fit connection 139 that is further coupled together via fasteners, in this example bolts (not shown). As seen in FIG. 10, the outer shell 144 and inner subassembly 146 form a bottom 147 which has at least one aperture, in this example in the form of a slot 148, extending therethrough.

As seen in FIG. 4, end wall 80 is a part of the inner subassembly 146 of the dehumidification assembly 138 in this example. The inner subassembly includes a base member 152. The end wall is circular in this example and couples to and extends outwards from a first or inner side 154 of the base member. The end wall 80 is centrally positioned relative to the base member 152 in this example. The inner subassembly 146 includes a pair of lower protrusions 156 and 158 that couple to and extend outwards from the inner side 154 of the base member. Each of the protrusions includes respective apertures 157 and 159 extending therethrough.

As seen in FIGS. 3 and 4, the dehumidification assembly 138 is selectively removable from the rest of the sensor assembly 64 for sanitary purposes. In this example and referring to FIG. 4, the sensor assembly includes a recessed portion 160 centrally positioned between the sides 60 and 62 of the device 50 and extending inwards from the front 56 of the device towards the rear 58 of the device.

The recessed portion of the sensor assembly includes a central aperture 162 and a pair of spaced-apart lower apertures 164 and 166. Aperture 164 seen in FIG. 4 is in fluid communication with conduit 104, environmental sensor 100, oxygen sensor 122 and solenoid valve 134 seen in FIG. 2. Aperture 166 is in fluid communication with conduit 90 and pressure sensor 86 seen in FIG. 2.

Referring back to FIG. 4, the end wall 80 and protrusions 156 and 158 selectively extend through the apertures 162, 164 and 166, and couple to adjacent portions of the sensor assembly 64 via seals, in this example O-rings 168, 170 and 172 extending about the end wall and protrusions. The dehumidification assembly 138 is thus selectively removable and may be referred to as a removable cartridge assembly, which may be press-fit and/or fastened in place via fasteners such as bolts (not shown). The O-rings 168, 170 and 172 seal the airflow path from the rest of the device 50.

As seen in FIG. 10, the dehumidification assembly 138 includes a dehumidification chamber 174. The dehumidification chamber is formed in part by shell 144 comprising front wall 140, bottom 147 and end wall 80, and side walls 141 and 143 seen in FIG. 6. Referring back to FIG. 10, the dehumidification chamber 174 has an interior 175 enclosed by the front wall, bottom, end wall and side walls. The interior of the dehumidification chamber is accessible via the slot 148 of the dehumidification chamber. The apertures 142b, 142n of the front wall expose the dehumidification chamber 174 to ambient air 176. The slot 148 extending through the bottom 147 is shaped further expose the dehumidification chamber to ambient air. The dehumidification chamber 174 may thus be said to have a plurality of openings including apertures 142*b*, 142*n* and slot 148. The dehumidification chamber is shaped to promote a flow of air therethrough, including airflow entering into the chamber via apertures 142*b* and 142*n*, as seen by arrows 178, and airflow exiting the chamber via slot 148, as seen by arrows 180.

Referring to FIG. 2, the dehumidification assembly 138 includes at least one, and in this example a pair of conduits, in this case flexible, dehumidification conduits 182 and 184. The dehumidification conduits are sub-portions of conduits 90 and 128 in this example. The dehumidification conduits 182 and 184 have hydrophobic properties and are made of hydrophobic material in this example. Each of the dehumidification conduits comprises Nafion™-type tubing in this example, which may be purchased at Perma Pure LLC, having an address of 1001 New Hampshire Ave., Lakewood, New Jersey, 08701, United States of America. However, this is not strictly required and the dehumidification conduits may be made of other types in other embodiments.

The dehumidification conduits 182 and 184 are positioned to receive sample portions of air from one or more of expirations, as shown by arrow 74, passing through the breathing conduit 66. The dehumidification conduits are also positioned to receive sample portions of air from inhalations, as shown by arrow 78, passing through the breathing conduit. The dehumidification conduits 182 and 184 are disposed at least in part within the dehumidification chamber 174.

As seen in FIG. 10, each dehumidification conduit 184 may include a plurality of circumferentially, longitudinally and axially spaced-apart apertures 186 via which water particles/droplets may diffuse outwards, as shown by arrows of number 188. The device 50 utilizes passive diffusion of humidity, with the area surrounding the dehumidification conduits, namely, dehumidification chamber 174, being purged by ambient shown moving in airflow direction arrows 178 and 180 flowing through apertures 142*b* and 142*n* and slot 148. The dehumidification conduits 184 are semi-open to ambient air with a volume that promotes humidity normalization through air-exchange and diffusion to the ambient air, particularly with wind and head movement of the user (not shown).

Figure 7:
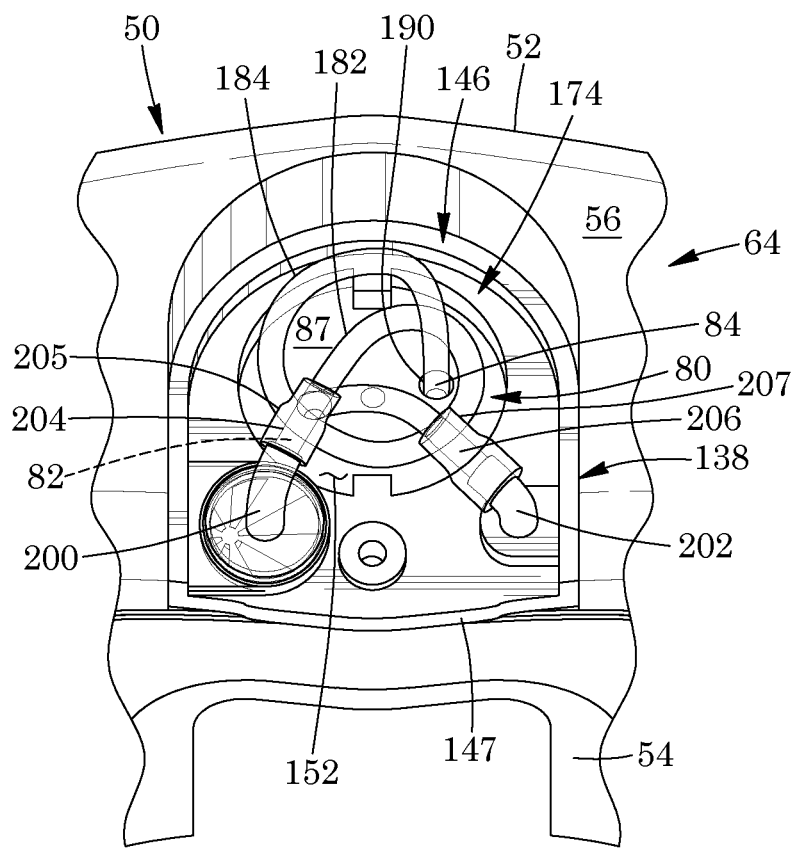
FIG. 7 is a front, bottom perspective view of the inner subassembly of the dehumidification cartridge coupled to the sensor assembly, with the outer shell of the dehumidification cartridge being removed and not shown.

As seen in FIG. 2, the dehumidification conduits 182 and 184 extend from their corresponding sensor sampling ports 82 and 84 towards sensor 86 and sensors 100 and 122, respectively. As seen in FIG. 7, dehumidification conduit 184, in fluid communication with the environmental sensor 100 and oxygen sensor 122 seen in FIG. 2, is longer than dehumidification conduit 182 in fluid communication with the differential pressure sensor 86 seen in FIG. 2. Referring back to FIG. 7, dehumidification conduit 184 spirals within dehumidification chamber 174 in this example.

As seen in FIG. 11, each dehumidification conduit 184 has a proximal end 189 with a proximal end portion 190 which is at least in part press-fit into its corresponding sensor sampling port 84 in this example. The sensor sampling port is part of a bore 95. The proximal end portion of the dehumidification conduit is positioned such that the proximal end 192 of the dehumidification conduit is flush with its sensor sampling port 84 and flush with the inner side 85 of wall 80.

Still referring to FIG. 11, the dehumidification assembly 138 includes adhesive 194 selectively positioned within and, in this example, injected via passageway 135 into each annular recess 130 of wall 80. The passageway is thus shaped to direct adhesive into the annular recess. The adhesive 194 thus further couples each of the proximal end portions 190 of the dehumidification conduits 184 to their respective wall portion 129 of the wall 80 in this example. The adhesive 194 is spaced-apart from the inner side 85 of the wall 80 and is positioned between the inner side and outer side 87 of the wall in this example. Each dehumidifying conduit 184 thus couples to its corresponding wall portion 129 via a relatively small contact area of adhesive. As each wall portion 129 is selectively removable, so too is each dehumidification conduit thus selectively removable and replaceable. Each dehumidifying conduit thus couples to its corresponding wall portion in a manner which inhibits the extent to which the adhesive 194 covers the outer surface 185 thereof.

As seen in FIG. 11, each dehumidification conduit 184 has a longitudinal axis 196 about which the proximal end portion 190 thereof extends. As seen in FIG. 10, the breathing conduit 66 is shaped to promote a sample portion flow of air 198 adjacent the sensor sampling ports 84 in one or more directions perpendicular (upwards or downwards relative to FIG. 10) to the longitudinal axes of the dehumidification conduits. However, this is not strictly required for the pressure sensor sampling port 82 seen in FIG. 2. The hydrophobic nature of the dehumidification conduits 184 functions to promote repelling of water droplets 79 and functions to inhibit water droplets from entering within the sensor sampling ports 82 and 84. The second longitudinal axis 155 of the passageway 135 extends parallel to longitudinal axis 196 of the dehumidification conduit in this example.

Still referring to FIG. 2, the humidification conduits 182 and 184 are in fluid communication with sample volumes and a sample portion flow of air 198 of the flow of breath 74 and 199 through the breathing conduit 66, rather than the entire volume and flow of breath of the breathing conduit. The humidification conduits so positioned are the first point of contact for the sample line and are in fluid communication with the sample volumes and sample portion flow of air 198 of the flow of breath 74 and 199 through the breathing conduit.

Condensation may be more likely to occur at the location of contact between each dehumidification conduit (Nafion™) and plastic (except for the hydrophobic properties of Nafion™) due to the temperature difference between the plastic and sample volume. The dehumidification conduits 182 and 184 so positioned may minimize the area that: cannot efficiently desiccate; accumulates micro-droplets; and provides nucleation sites for condensation. The dehumidification conduits so positioned, coupled to the device 50 and herein configured, may maximize the effective desiccation ability for a given length of conduit, thereby reducing the required dehumidification conduit length comprising the hydrophobic properties.

As seen in FIG. 7, the dehumidification assembly 138 includes a pair of connectors, in this example spaced-apart hose barbs 200 and 202 coupled to the base member 152 of the inner subassembly 146. The barbs are positioned within the dehumidification chamber 174 in this example. Distal ends 204 and 206 of the dehumidification conduits 182 and 184 couple to the hose barbs 200 and 202 via sleeves 205 and 207 that extend about and press fit to the respective hose barbs. The sleeves thus couple to the distal ends of the dehumidification conduits. The distal ends 204 and 206 of the dehumidification conduits 182 and 184 are in fluid communication with apertures 157 and 159 seen in FIG. 4 via the hose barbs 200 and 202 seen in FIG. 7.

Referring to FIG. 11, adhesive 194 is positioned in such a way that the dehumidification conduits 182 and 184 are in contact with a minimal area that is not air. Each dehumidification conduit is not contacting air for about 1 mm of length that contacts the adhesive and 0.5 mm of length where it contacts the plastic/barb just before it ends at the distal end thereof in this example; however, these dimensions are not strictly required and may be different in other embodiments. The spacing and geometry shown in FIG. 11 is configured to facilitate flow of the adhesive 194.

Figure 9:
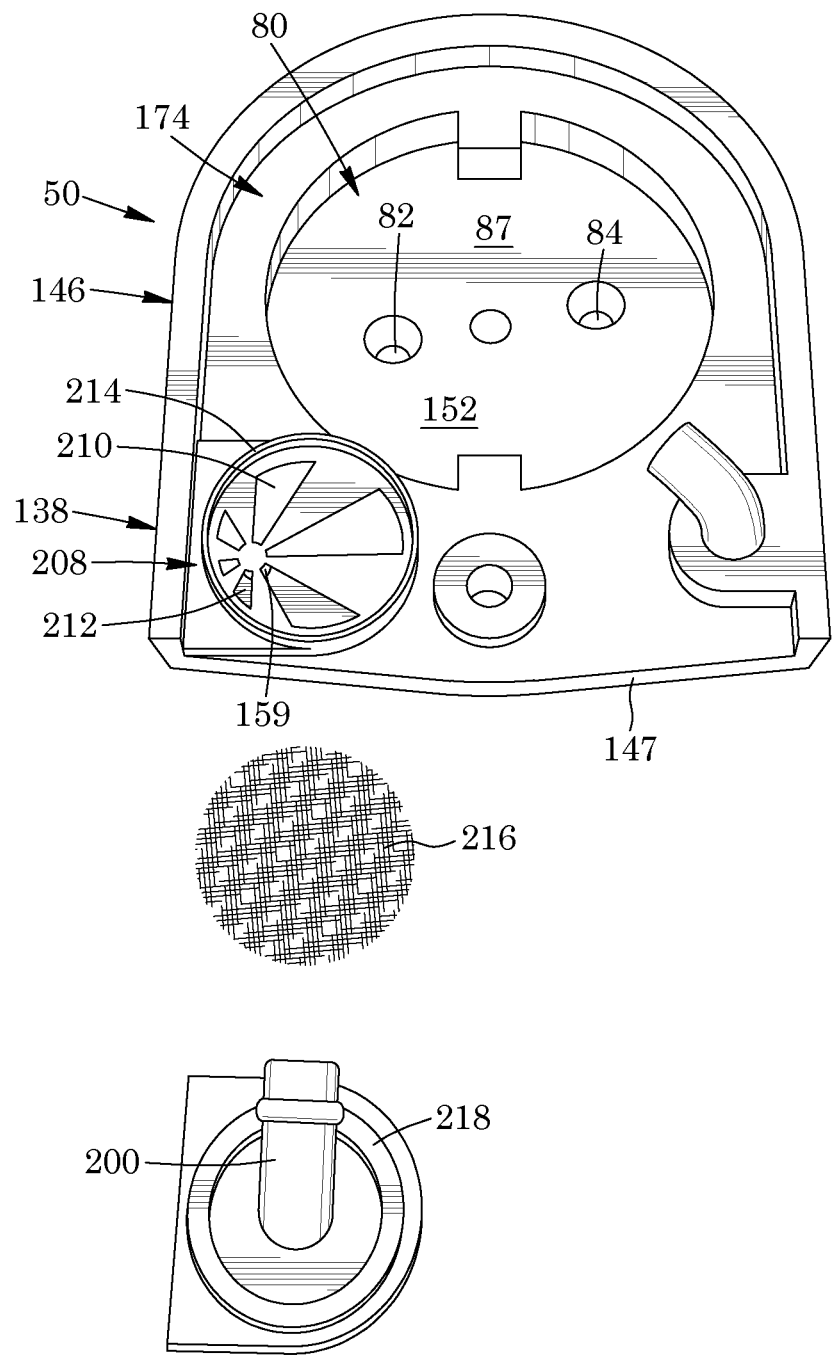
FIG. 9 is an exploded front perspective view of the inner subassembly of the dehumidification cartridge, showing a moisture trap in the form of a hydrophobic membrane.

As seen in FIG. 9, the dehumidification assembly 138 includes a moisture trap 208 comprising a hollow enclosure 210 which is generally circular in this example; however, this is not strictly required. The moisture trap 208 includes a first barrier member, in this example filter material or hydrophobic membrane 216. The hydrophobic membrane facilitates passage of gas therethrough while inhibiting passage of moisture therethrough.

The enclosure 210 of the moisture trap 208 includes a second barrier member, in this example in the form of an intermediate wall 214. The intermediate wall is meshed in this example and has a series of openings, in this example wedge-shaped openings 212 extending therethrough. The hydrophobic membrane 216 extends along, is coextensive with and couples to the intermediate wall 214 of the enclosure 210 in this example. The intermediate wall is circular in this example, though this is not strictly required.

The enclosure 210 of the moisture trap 208 includes an outer end or shell 218 which is circular in this example. The shell couples to and extends about wall 214, with the hydrophobic membrane 216 positioned therebetween. Hose barb 200 couples to and is integrally formed with the outer shell 218 in this example. The enclosure 210 of the moisture trap 208 is in fluid communication with aperture 159 and is thus in fluid communication with environmental sensor 100 and oxygen sensor 122 seen in FIG. 2. Referring back to FIG. 9, the moisture trap is configured to further inhibit damage to the environmental sensor and oxygen sensor.

Figure 8:
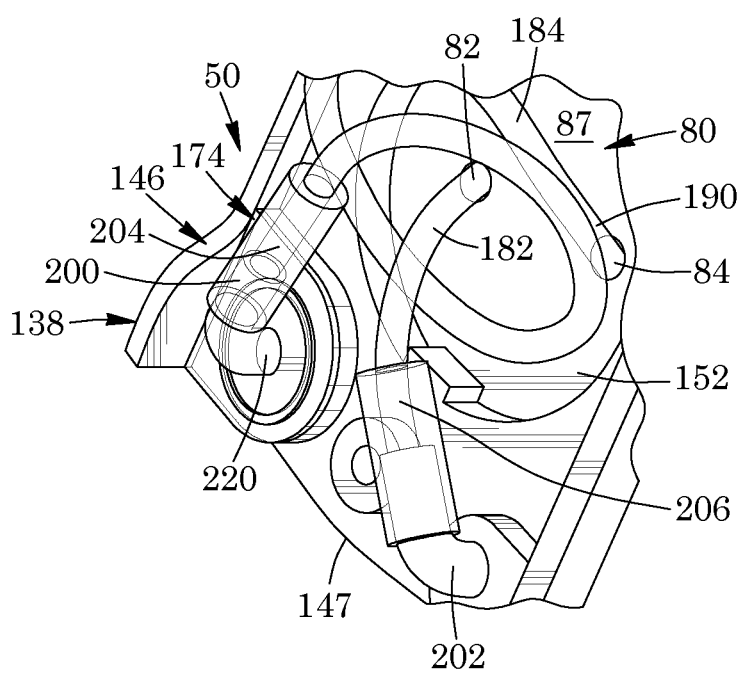
FIG. 8 is a front perspective view of the inner subassembly of the dehumidification cartridge shown in fragment, with a water contact indicator thereof shown shaded or colored to indicate the presence of water.

As seen in FIG. 8, the dehumidification assembly 138 includes water contact indicator 220. The water indicator is positioned within the enclosure 210 and couples to the hydrophobic membrane 216. The water contact indicator 220 is configured to change color upon detecting or coming into contact with water ingress, and thereby indicates when a water ingress event has occurred.

The dehumidification assembly 138 seen in FIG. 4 and as herein described is shaped to facilitate periodic replacement thereof and/or the dehumidification conduits 182 and 184 seen in FIG. 7.

FIGS. 15 to 21 show ventilation measuring device 50.1 according to a second aspect. Like parts have like numbers and functions as the ventilation measuring device 50 shown in FIGS. 1 to 14 with the addition of decimal extension "0.1". Ventilation measuring device 50.1 is substantially the same as ventilation measuring device 50 shown in FIGS. 1 to 14 with at least the following exceptions.

Figure 12:
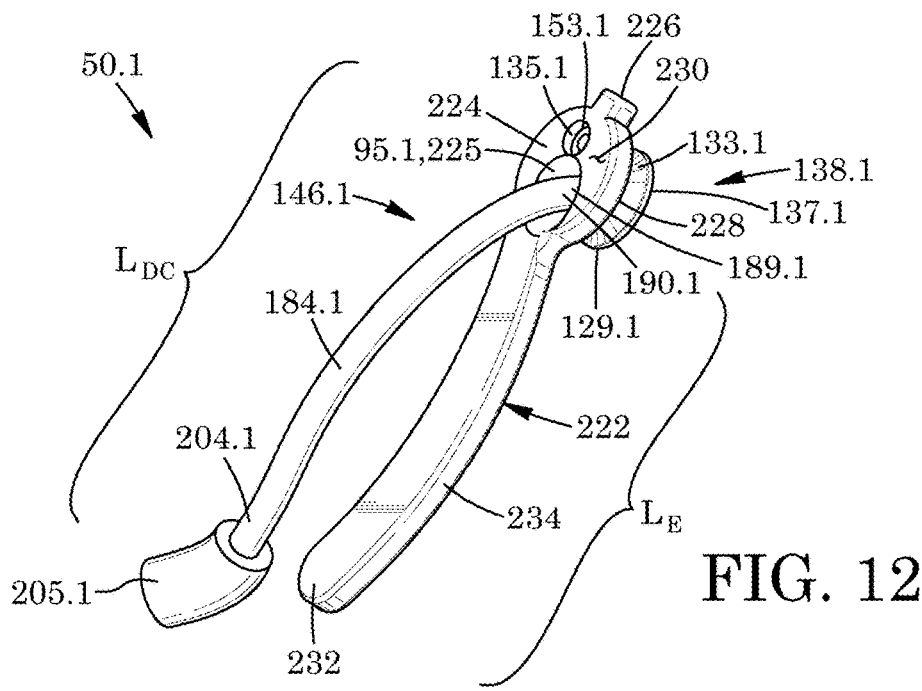
FIG. 12 is a front, top perspective view of a dehumidification conduit and lever of a ventilation measuring device according to a second aspect.

As seen in FIG. 12, the inner subassembly 146.1 of dehumidification assembly 138.1 includes an elongate member, in this example a handle, in this case a lever arm 222. The lever arm 222 includes a first or proximal end portion, in this example an enlarged end portion 224 which is circular in profile in this example. The lever arm includes a protrusion, in this example a catch 226 coupled to and extending radially outwards from the enlarged end portion thereof. The catch is a rectangular prism in shape and rectangular in profile in this example. The catch 226 is shaped to fit within a corresponding opening or catch recess 227 of the dehumidification chamber 174.1 seen in FIG. 17. The dehumidification chamber has an arcuate shaped member, in this example an outwardly concave seat, in this case an arc-shaped wall portion 229. The catch recess 227 extends into the arc-shaped wall portion of the dehumidification chamber 174.1. The arc-shaped wall portion of the dehumidification chamber 174.1 is outwardly concave in this example and extends about an axis 235. The arc-shaped wall portion 229 is shaped to receive the enlarged end portion 224 of the lever arm 222 and enable the lever arm to pivot about the same and axis 235. The lever arm is thus pivotable relative to the enlarged end portion thereof and relative to the arc-shaped wall portion 229 of the dehumidification chamber 174.1. The arc-shaped wall portion of the dehumidification chamber extends about aperture 132.1.

Figure 13:
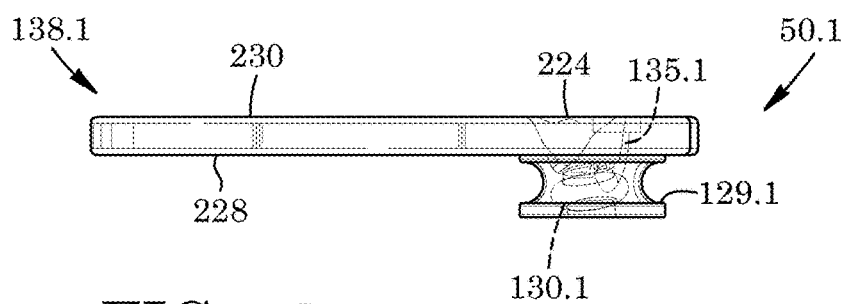
FIG. 13 is a top plan view of the lever of FIG. 12, with the dehumidification conduit being removed and not shown.

As seen in FIG. 13, wall portion or protrusion 129.1 couples to, is integrally formed with and extends outwards from a first or lower side 228 of the enlarged end portion 224 of the lever arm 222 in this example. Alternatively, protrusion 129.1 may be considered part of end portion 224 of the lever arm. As seen in FIG. 12, seal in this example O-ring 133.1 fits within outer annular groove 137.1 and extends about the protrusion. As seen in FIG. 12, protrusion 129.1 is smaller than and radially inwardly spaced form end portion 224 of the lever arm 222. The protrusion and end portion 224 of the lever are coaxial in this example. Passageway 135.1 extends through a second or upper side 230 of the enlarged end portion of the lever arm through to annular recess 130.1.

Bore 95.1 extends through the enlarged end portion 224 of the lever arm 222 and is shaped to receive the proximal end 189.1 of the conduit. The second end portion 153.1 of the passageway is coaxial with the bore in this example; however, this is not strictly required. The second end portion of the passageway has a diameter $D_{SE}$ which is smaller than the diameter DB of the bore 95.1 in this example.

Figure 17:
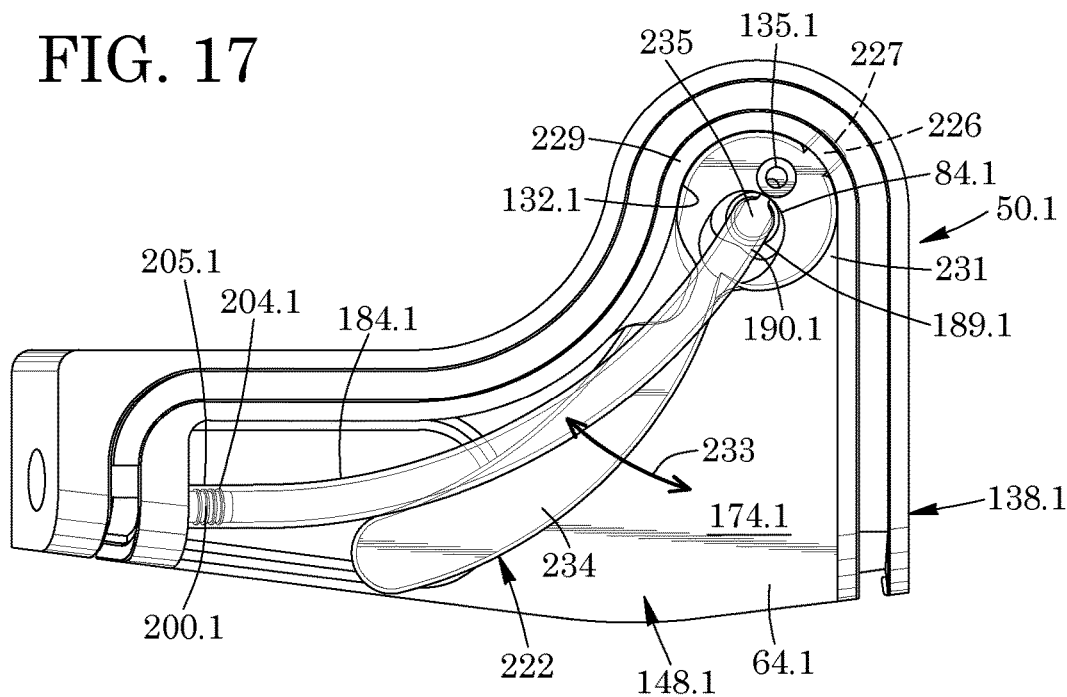
FIG. 17 is a sectional view of the dehumidification chamber of the ventilation measuring device of FIG. 16, with the proximal end portion of the dehumidification conduit shown coupled to a sensor sampling port of the ventilation measuring device and with the lever positioned within the dehumidification chamber in a stowed position.

As seen in FIG. 12, dehumidification conduit 184.1 extends through a first or central aperture 225 of the enlarged end portion 224 of the lever arm. The central aperture aligns with the sensor sampling port 84.1. The dehumidification conduit 184.1 couples to protrusion 129.1 in a manner as previously described above in FIGS. 1 to 11 via adhesive and optionally press fitting. The proximal end portion 190.1 of the dehumidification conduit thus couples to and aligns with the enlarged end portion 224 of the lever arm 222. As seen in FIG. 17, the lever arm thus couples to and extends outwards from proximal end 189.1 of the dehumidification conduit 184.1 in this example and towards distal end 204.1 of the dehumidification conduit.

Figure 14:
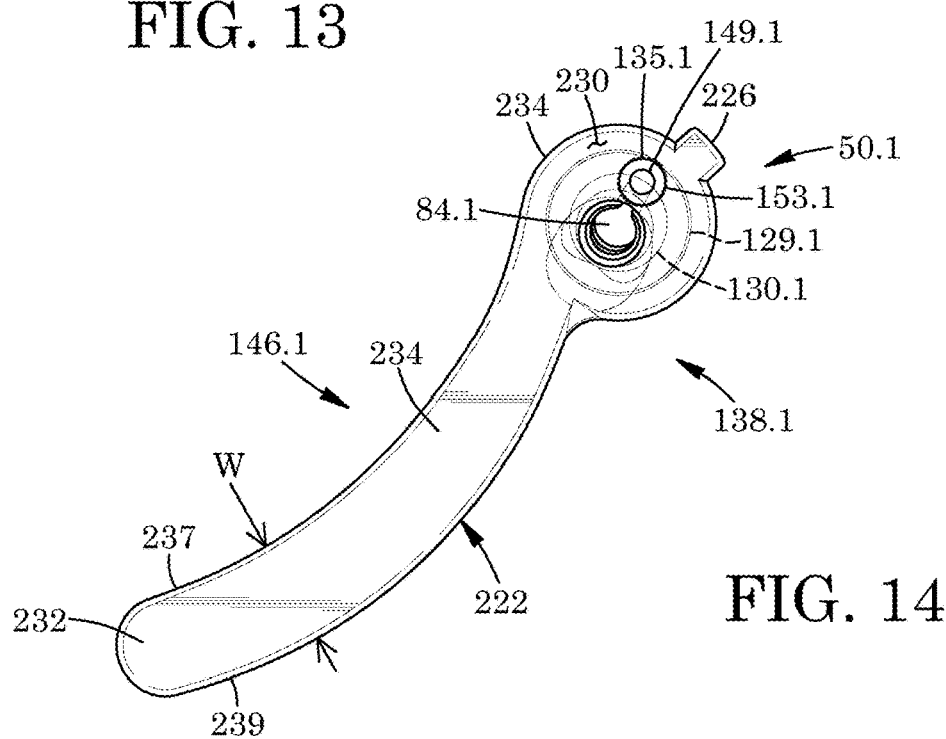
FIG. 14 is a front elevation view of the lever of FIG. 12, with the dehumidification conduit being removed and not shown.
Figure 15:
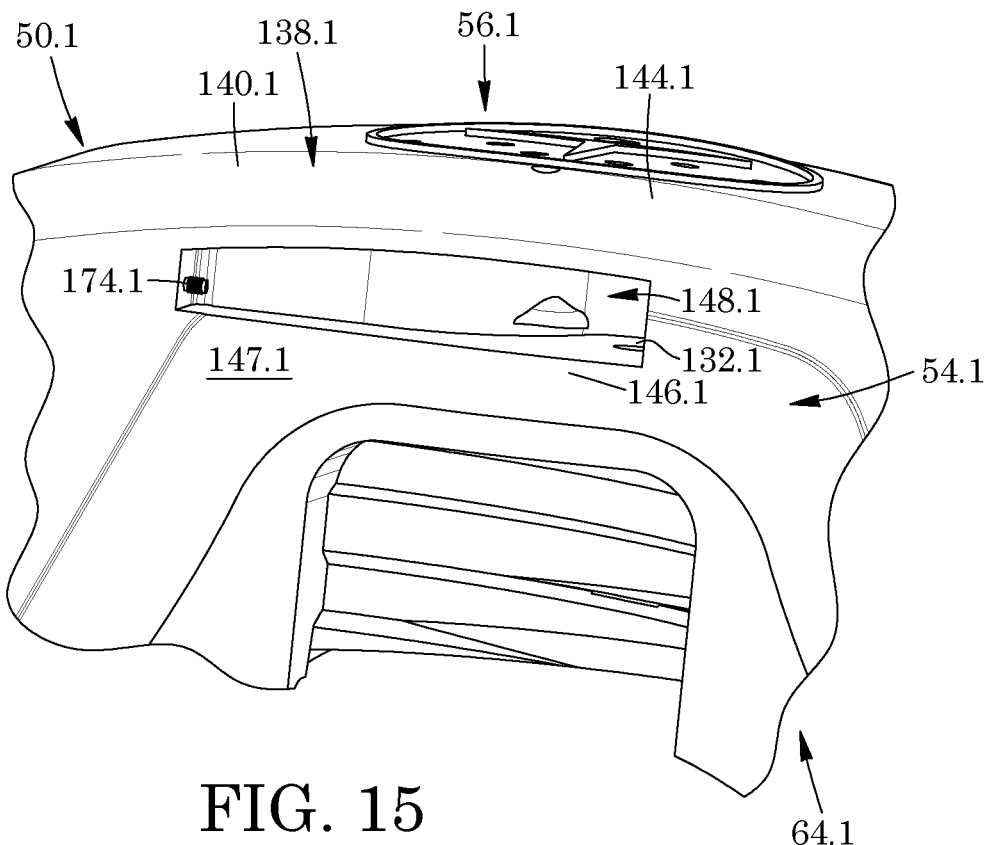
FIG. 15 is a bottom perspective view of the ventilation measuring device of FIG. 12, with a breathing conduit thereof being removed and not shown.

Referring to FIG. 14, the lever arm includes a second or distal end portion, in this example a gripping end portion 232 spaced-apart from the enlarged end portion thereof. The lever arm 222 includes an elongate portion 234 extending between the gripping end portion thereof and enlarged end portion 224 thereof. The gripping end portion and elongate portion of the lever arm are planar and have a constant width W in this example. As seen in FIG. 12, elongate portion 234 of the lever arm has a length $L_E$ equal to or less than the length $L_{DC}$ of the dehumidification conduit 184.1.

The gripping end portion 232 of the lever arm 222 is outwardly convex and semi-circular in planar profile in this example; however, this is not strictly required. The elongate portion 234 of the lever arm is arc-shaped in this example. The elongate portion of the lever arm 222 has a first peripheral edge portion 237 that extends outwards tangentially from the enlarged end portion 224 of the lever arm in this example. The elongate portion 234 of the lever arm has a second peripheral edge portion 239 which is spaced-apart from and which generally extends parallel to the first peripheral edge portion thereof; however, this is not strictly required.

Figure 16:
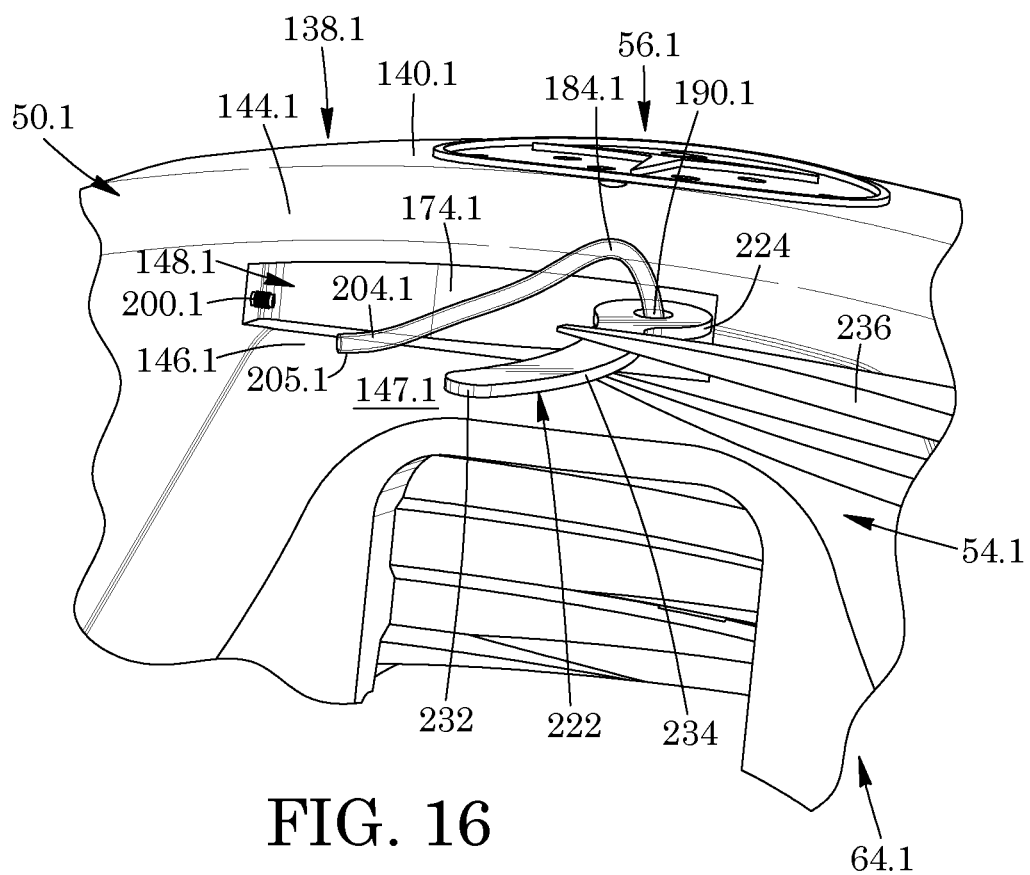
FIG. 16 is a bottom perspective view of the ventilation measuring device of FIG. 15, with the dehumidification conduit and lever thereof shown in the process of being inserted within a dehumidification chamber of the device via a slot thereof and shown in the process of coupling to a dehumidification cartridge of the device.
Figure 18:
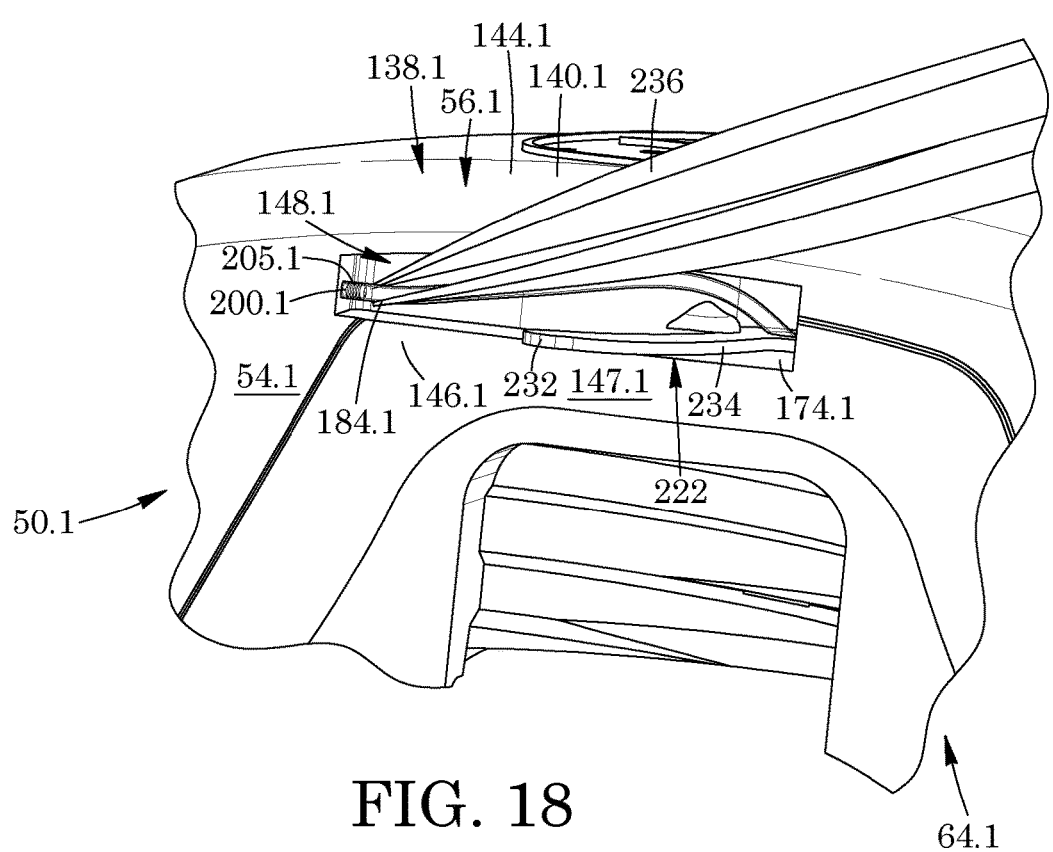
FIG. 18 is a bottom perspective view of the ventilation measuring device of FIG. 17, with the distal end portion of the dehumidification conduit shown in the process of being coupled to a hose barb.
Figure 19:
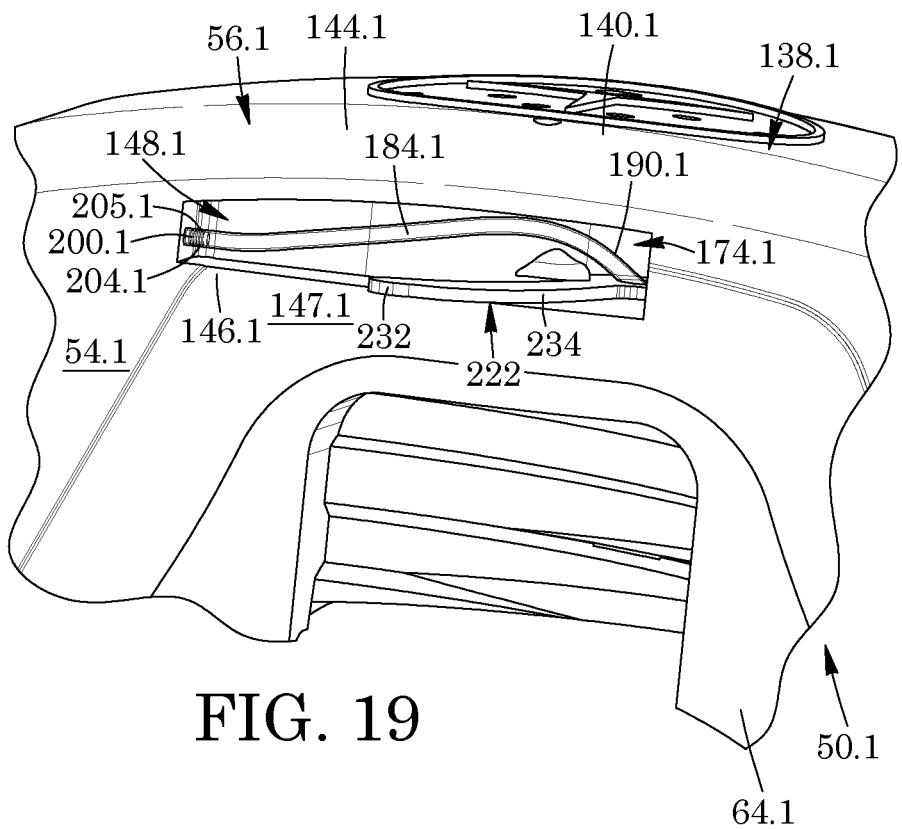
FIG. 19 is a bottom perspective view of the ventilation measuring device of FIG. 18 with the distal end portion of the dehumidification conduit shown coupled to the hose barb, and with the distal end portion of the lever shown extending outwards from the dehumidification chamber in a deployed position.

Referring to FIG. 16, the dehumidification conduit 184.1 is selectively insertable into the dehumidification chamber 174.1 and removable therefrom through slot 148.1 via lever arm 222. The dehumidification conduit is thus selectively replaceable. The user may first holds the dehumidification conduit 184.1 via in the lever arm 222, in this example by holding the elongate portion 234 of the lever arm via a gripping member, in this example tweezers 236. The enlarged end portion 224 is next positioned within recess 231 formed by wall portion 229 seen in FIG. 17, with protrusion 129.1 being shaped to selectively and sealably fit within aperture 132.1, such that catch 226 is positioned within catch recess 227 of the device 50. This functions to sealably couple protrusion 129.1 seen in FIG. 12 in place for receiving inspirations and exhalations, while enabling the lever arm to selectively rotate as shown by arrow of numeral 233. The lever arm 222 is rigid and is thus shaped to facilitate coupling the proximal end 189.1 and proximal end portion 190.1 of the dehumidification conduit 184.1 to a distal location within the dehumidification chamber 174.1, in this example aperture 132.1. The dehumidification conduit is thus positionable within the dehumidification chamber via the lever arm. The lever arm 222 so configured in FIGS. 16 and 18 is in a deployed position in which at least a portion thereof extends outwards from the slot 148.1 of the dehumidification chamber 174.1: in this example the gripping end portion 232 thereof extends past the slot 148.1 and outwards from the dehumidification chamber 174.1.

Rotation of the distal end portion 232 of the lever 222 relative to the proximal end portion 190.1 of the lever promotes rotation of the dehumidification conduit 184.1. Referring to FIG. 18; sleeve 205.1, or portions of the dehumidification conduit 184.1 adjacent thereto, are next gripped by the tweezers 236 so as to couple the sleeve to the corresponding hose barb 200.1, in this example by press-fitting the sleeve about the hose barb.

Figure 20:
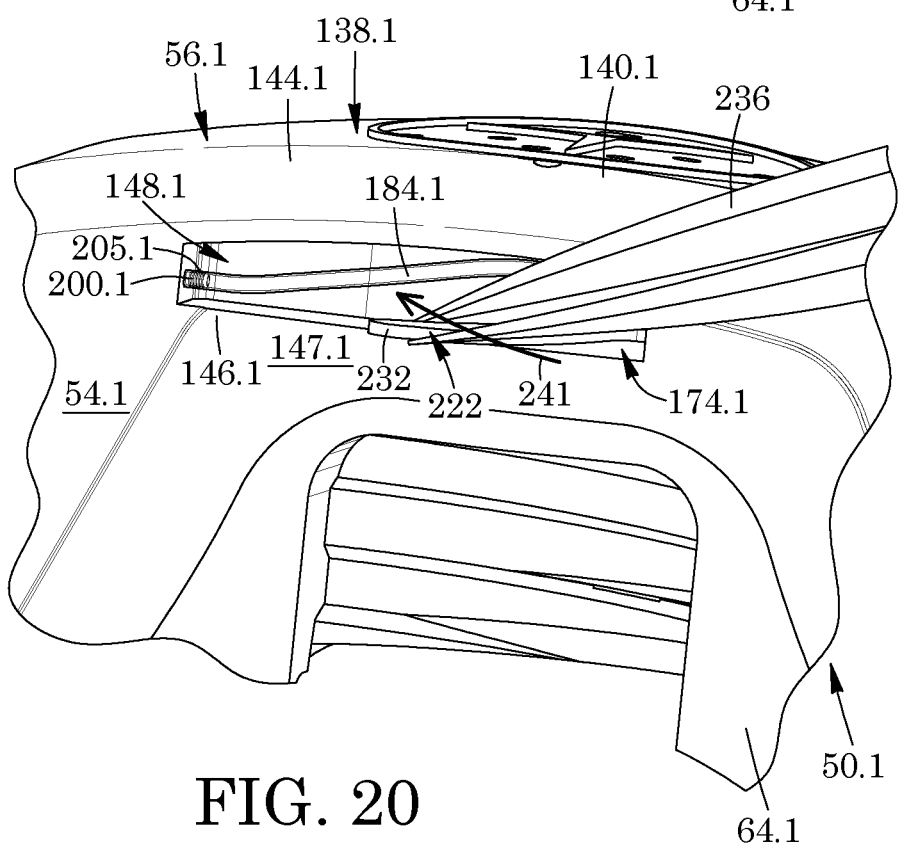
FIG. 20 is a bottom perspective view of the ventilation measuring device of FIG. 19, with the lever thereof being shown in the process of being moved from the deployed position to the stowed position.
Figure 21:
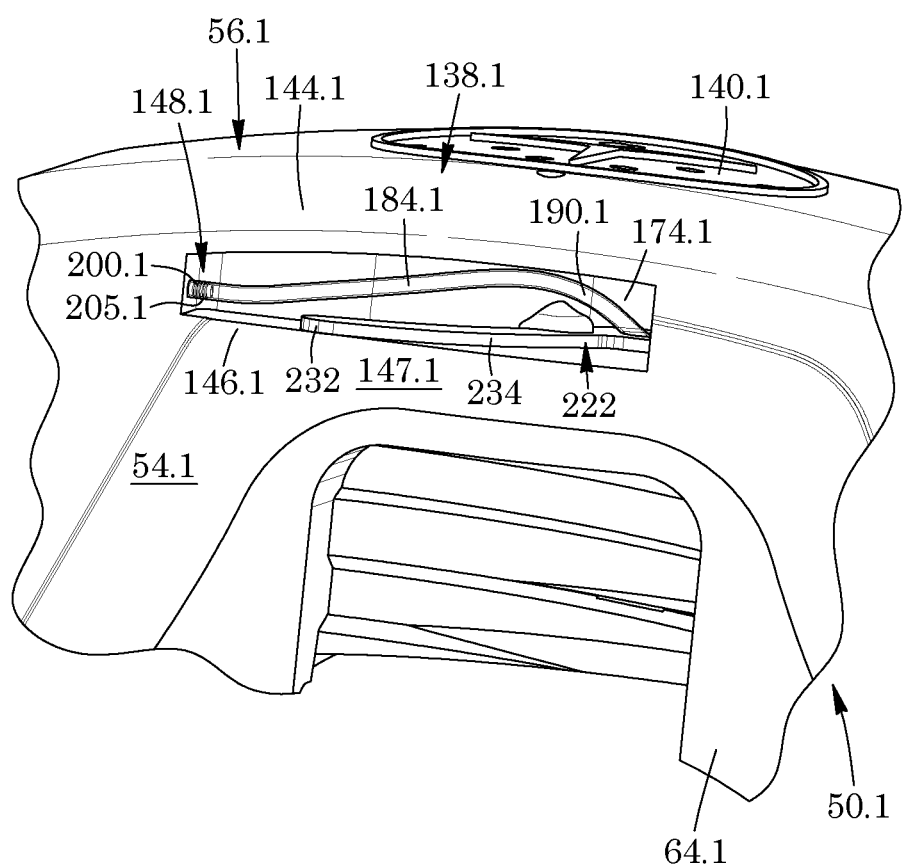
FIG. 21 is a bottom perspective view of the ventilation measuring device of FIG. 19, with the dehumidification conduit and lever thereof shown fully positioned with the dehumidification chamber thereof, with the lever thus being in the stowed position.

The gripping end portion 232 of the lever arm 222 is next pushed inwards via the tweezers 236, as seen by arrow of numeral 241, causing the lever arm 222 to rotate from the deployed position seen in FIG. 20, to a stowed position seen in FIG. 21. The lever arm in the stowed position thereof is positioned within the dehumidification chamber 174.1. The gripping end portion 232 of the lever arm 222 is flush with or spaced inwards from the bottom 54.1 of the device 50.1 in the stowed position of the lever arm The above-described steps followed in reverse enable the lever arm 222 to be selectively removed. The lever arm is moved from the stowed position to the deployed position via the tweezers 236. The lever arm 222 is thereafter selectively removable from the dehumidification chamber 174.1 by pulling outwards on the now-exposed gripping end portion thereof. The lever arm thus facilitates selective insertion of the dehumidification conduit 184.1 into the dehumidification chamber 174.1 and removal therefrom.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. A device for measuring a person's ventilation including oxygen consumption, the device comprising:
   a breathing conduit having an interior, including a wall and including at least one sensor sampling port extending through the wall thereof;
   a dehumidification conduit including a proximal end portion coupled to and flush with the sensor sampling port, the dehumidification conduit having a longitudinal axis about which the proximal end portion thereof extends, and the breathing conduit being shaped to promote a flow of air adjacent the sensor sampling port in one or more directions generally perpendicular to said axis;
   a reservoir;
   adhesive; and
   a passageway via which the adhesive is injected into the reservoir such that the adhesive selectively couples the dehumidification conduit to the wall at a location spaced-apart from the interior of the breathing conduit.

2. The device as claimed in claim 1, wherein the wall of the breathing conduit has an inner side in fluid communication with the interior of the breathing conduit, and wherein the dehumidification conduit has a proximal end flush with the inner side of the wall of the breathing conduit.

3. The device of claim 1, wherein the reservoir is annular.

4. The device of claim 1, wherein the wall has an inner side in fluid communication with the interior of the breathing conduit, wherein the wall has an annular recess spaced from the inner side thereof.

5. The device of claim 1, wherein the adhesive is positioned between an inner side and an outer side of the wall.

6. The device of claim 1, wherein a portion of the wall through which the sensor sampling port extends, sealably couples to and is selectively removable from a corresponding aperture in the wall.

7. The device as claimed in claim 1, wherein the dehumidification conduit is configured to promote diffusion of water particles therethrough and outwards therefrom.

8. The device as claimed in claim 1, wherein the device includes a dehumidification chamber shaped to extend at least in part about the dehumidification conduit, and wherein the dehumidification chamber has one or more apertures to facilitate passage of air therethrough.

9. The device as claimed in claim 1, wherein the dehumidification conduit has hydrophobic properties and is made of hydrophobic material, with the hydrophobic nature of the dehumidification conduit functioning to promote repelling of water droplets and functioning to inhibit water droplets from entering within the sensor sampling port.

10. The device as claimed in claim 1, including an oxygen sensor having a pair of oxygen sensor ports in fluid communication with the sensor sampling port via a conduit of which the dehumidification conduit is a sub-portion, wherein the dehumidification conduit is positioned to minimize the area that i) cannot effectively desiccate, ii) accumulates micro-droplets, and iii) provides nucleation sites for condensation.

11. The device as claimed in claim 1, including an oxygen sensor having a pair of oxygen sensor ports in fluid communication with the sensor sampling port via a conduit of which the dehumidification conduit is a sub-portion, wherein the dehumidification conduit so positioned maximizes the effective desiccation ability for a given length of said conduit, thereby reducing the required dehumidification conduit length comprising hydrophobic properties.

12. The device according to claim 1, wherein the dehumidification conduit is made of a material which enables water particles to pass therethrough circumferentially and longitudinally therealong.

13. The device of claim 1, wherein the reservoir extends radially outwards from the sensor sampling port.

14. The device of claim 1, wherein the sensor sampling port comprises a bore which extends through the wall, wherein the proximal end portion of the dehumidification conduit fits within said bore, and wherein the reservoir is in fluid communication with and extends radially outwards from said bore.

15. The device of claim 1, wherein the reservoir is toroidal in shape.

16. The device of claim 1, including a moisture trap to inhibit damage from water ingress, the moisture trap being in fluid communication with the dehumidification conduit.

17. The device of claim 1, including a water contact indicator to indicate when a water ingress event has occurred, the water contact indicator being in fluid communication with the dehumidification conduit.

18. A device for measuring a person's ventilation including oxygen consumption, the device comprising:
   a breathing conduit including at least one sensor sampling port;
   a dehumidification conduit including a proximal end portion coupled to and flush with the sensor sampling port, the dehumidification conduit having a longitudinal axis about which the proximal end portion thereof extends, and the breathing conduit being shaped to promote a flow of air adjacent the sensor sampling port in one or more directions generally perpendicular to said axis;
   a dehumidification chamber shaped to extend at least in part about the dehumidification conduit; and
   an elongate member shaped to facilitate selective insertion of the dehumidification conduit into the dehumidification chamber and removal therefrom, wherein the elongate member is shaped to be received at least in part within and be pivotable relative to the dehumidification chamber.

19. A device for measuring a person's ventilation including oxygen consumption, the device comprising:
   a breathing conduit including at least one sensor sampling port; and
   a dehumidification conduit including a proximal end portion coupled to and flush with the sensor sampling port, the dehumidification conduit having a longitudinal axis about which the proximal end portion thereof extends, and the breathing conduit being shaped to promote a flow of air adjacent the sensor sampling port in one or more directions generally perpendicular to said axis;
   a dehumidification chamber shaped to extend at least in part about the dehumidification conduit; and
   an elongate member shaped to facilitate selective insertion of the dehumidification conduit into the dehumidification chamber and removal therefrom, wherein the elongate member has a stowed position in which the elongate member is positioned within the dehumidification chamber, and wherein the elongate member is moveable from the stowed position to a deployed position in which at least a portion thereof extends outwards from the dehumidification chamber.

20. A device for measuring a person's ventilation including oxygen consumption, the device comprising:
   a breathing conduit including at least one sensor sampling port;
   a dehumidification conduit including a proximal end portion coupled to and flush with the sensor sampling port, the dehumidification conduit having a longitudinal axis about which the proximal end portion thereof extends, and the breathing conduit being shaped to promote a flow of air adjacent the sensor sampling port in one or more directions generally perpendicular to said axis;
   a dehumidification chamber shaped to extend at least in part about the dehumidification conduit, wherein the dehumidification chamber has a slot; and
   an elongate member shaped to facilitate selective insertion of the dehumidification conduit into the dehumidification chamber and removal therefrom, wherein the elongate member in a deployed position thereof extends in part through the slot and outwards from the dehumidification chamber for selectively removing the elongate member and thus the dehumidification conduit from the dehumidification chamber.

* * * * *